United States Patent
Huang et al.

(10) Patent No.: US 11,728,918 B2
(45) Date of Patent: Aug. 15, 2023

(54) MULTI-BIT PAYLOAD TRANSMISSION WITH ORTHOGONAL SEQUENCES

(71) Applicant: QUALCOMM Incorporated, San Diego, CA (US)

(72) Inventors: Yi Huang, San Diego, CA (US); Wei Yang, San Diego, CA (US); Peter Gaal, San Diego, CA (US); Wanshi Chen, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 17/152,402

(22) Filed: Jan. 19, 2021

(65) Prior Publication Data

US 2021/0320739 A1    Oct. 14, 2021

Related U.S. Application Data

(60) Provisional application No. 63/008,424, filed on Apr. 10, 2020.

(51) Int. Cl.
  *H04J 13/12*   (2011.01)
  *H04J 13/00*   (2011.01)
  *H04L 27/26*   (2006.01)

(52) U.S. Cl.
  CPC .......... *H04J 13/12* (2013.01); *H04J 13/0048* (2013.01); *H04L 27/26035* (2021.01); *H04L 27/2636* (2013.01)

(58) Field of Classification Search
  CPC . H04J 13/12; H04J 13/0048; H04L 27/26035; H04L 27/2636

USPC .................................................. 370/329–330
See application file for complete search history.

(56) References Cited

U.S. PATENT DOCUMENTS

| | | | |
|---|---|---|---|
| 6,526,091 B1 | 2/2003 | Nystrom et al. | |
| 2008/0069186 A1* | 3/2008 | Rice | H04J 13/102 375/146 |
| 2013/0315051 A1 | 11/2013 | Malladi et al. | |
| 2018/0323892 A1 | 11/2018 | Wang et al. | |
| 2019/0165879 A1* | 5/2019 | Wang | H04L 1/001 |
| 2019/0229751 A1* | 7/2019 | Kim | H03M 13/1188 |
| 2021/0167800 A1* | 6/2021 | Shin | H03M 13/116 |

OTHER PUBLICATIONS

Partial International Search Report—PCT/US2021/022136—ISA/EPO—dated Jun. 15, 2021.
International Search Report and Written Opinion—PCT/US2021/022136—ISA/EPO—dated Aug. 20, 2021.

* cited by examiner

*Primary Examiner* — Candal Elpenord
(74) *Attorney, Agent, or Firm* — Qualcomm Incorporated

(57) ABSTRACT

Methods, systems, and devices for wireless communications are described. A user equipment (UE) may transmit an uplink payload in a wireless communications system. The UE may identify a set of sequences configured for conveying a payload including a set of bits, where each sequence of the set of sequences is orthogonal to each other sequence of the set of sequences. The UE may select a first sequence from the set of sequences based on a mapping between the set of sequences and payload values corresponding to the set of bits. The UE may transmit the payload including the set of bits using the first sequence.

29 Claims, 16 Drawing Sheets

MULTI-BIT PAYLOAD TRANSMISSION WITH ORTHOGONAL SEQUENCES

CROSS REFERENCE

The present Application for Patent claims the benefit of U.S. Provisional Patent Application No. 63/008,424 by HUANG et al., entitled "MULTI-BIT PAYLOAD TRANSMISSION WITH ORTHOGONAL SEQUENCES," filed Apr. 10, 2020, assigned to the assignee hereof, and expressly incorporated by reference in its entirety herein.

FIELD OF TECHNOLOGY

The following relates generally to wireless communications and more specifically to multi-bit payload transmission with orthogonal sequences.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). LTE may use OFDMA on the downlink, single-carrier frequency division multiple access (SC-FDMA) on the uplink, and multiple-input multiple-output (MIMO) antenna technology.

A wireless multiple-access communications system may include one or more base stations or one or more network access nodes, each simultaneously supporting communication for multiple communication devices, which may be otherwise known as user equipment (UE).

A UE may transmit an uplink payload to a base station. In some cases, the sequences used for mapping may cause interference, decreasing reception accuracy at the base station.

SUMMARY

The described techniques relate to improved methods, systems, devices, and apparatuses that support multi-bit payload transmission with orthogonal sequences. Generally, the described techniques provide for a device transmitting a payload using orthogonal sequences, such as a user equipment (UE) transmitting an uplink payload with orthogonal sequences in a wireless communications system. The UE may identify a set of sequences configured for conveying a payload including a set of bits, where each sequence of the set of sequences is orthogonal to each other sequence of the set of sequences. The UE may select a first sequence from the set of sequences based on a mapping between the set of sequences and payload values corresponding to the set of bits. The UE may transmit the payload including the set of bits using the first sequence.

A method of wireless communications at a UE is described. The method may include identifying a set of sequences configured for conveying a payload including a set of bits, where each sequence of the set of sequences is orthogonal to each other sequence of the set of sequences. The method may further include selecting a first sequence from the set of sequences based on a mapping between the set of sequences and payload values corresponding to the set of bits, and transmitting the payload including the set of bits using the first sequence.

An apparatus for wireless communications at a UE is described. The apparatus may include a processor, memory coupled with the processor, and instructions stored in the memory. The instructions may be executable by the processor to cause the apparatus to identify a set of sequences configured for conveying a payload including a set of bits, where each sequence of the set of sequences is orthogonal to each other sequence of the set of sequences. The instructions may be further executable by the processor to cause the apparatus to select a first sequence from the set of sequences based on a mapping between the set of sequences and payload values corresponding to the set of bits, and transmit the payload including the set of bits using the first sequence.

Another apparatus for wireless communications at a UE is described. The apparatus may include means for identifying a set of sequences configured for conveying a payload including a set of bits, where each sequence of the set of sequences is orthogonal to each other sequence of the set of sequences. The apparatus may further include means for selecting a first sequence from the set of sequences based on a mapping between the set of sequences and payload values corresponding to the set of bits, and transmitting the payload including the set of bits using the first sequence.

A non-transitory computer-readable medium storing code for wireless communications at a UE is described. The code may include instructions executable by a processor to identify a set of sequences configured for conveying a payload including a set of bits, where each sequence of the set of sequences is orthogonal to each other sequence of the set of sequences. The code may further include instructions executable by a processor to select a first sequence from the set of sequences based on a mapping between the set of sequences and payload values corresponding to the set of bits, and transmit the payload including the set of bits using the first sequence.

A method of wireless communications at a base station is described. The method may include identifying a set of sequences configured for conveying a payload including a set of bits, where each sequence of the set of sequences is orthogonal to each other sequence of the set of sequences. The method may further include receiving the payload including the set of bits using a first sequence from the set of sequences, the first sequence based on a mapping between the set of sequences and payload values corresponding to the set of bits.

An apparatus for wireless communications at a base station is described. The apparatus may include a processor, memory coupled with the processor, and instructions stored in the memory. The instructions may be executable by the processor to cause the apparatus to identify a set of sequences configured for conveying a payload including a set of bits, where each sequence of the set of sequences is orthogonal to each other sequence of the set of sequences. The instructions may be further executable by the processor to cause the apparatus to receive the payload including the set of bits using a first sequence from the set of sequences, the first sequence based on a mapping between the set of sequences and payload values corresponding to the set of bits.

Another apparatus for wireless communications at a base station is described. The apparatus may include means for identifying a set of sequences configured for conveying a payload including a set of bits, where each sequence of the set of sequences is orthogonal to each other sequence of the set of sequences. The apparatus may further include means for receiving the payload including the set of bits using a first sequence from the set of sequences, the first sequence based on a mapping between the set of sequences and payload values corresponding to the set of bits.

A non-transitory computer-readable medium storing code for wireless communications at a base station is described. The code may include instructions executable by a processor to identify a set of sequences configured for conveying a payload including a set of bits, where each sequence of the set of sequences is orthogonal to each other sequence of the set of sequences. The non-transitory computer readable medium may further include instructions executable by the processor to receive the payload including the set of bits using a first sequence from the set of sequences, the first sequence based on a mapping between the set of sequences and payload values corresponding to the set of bits.

DETAILED DESCRIPTION

Figure 1:
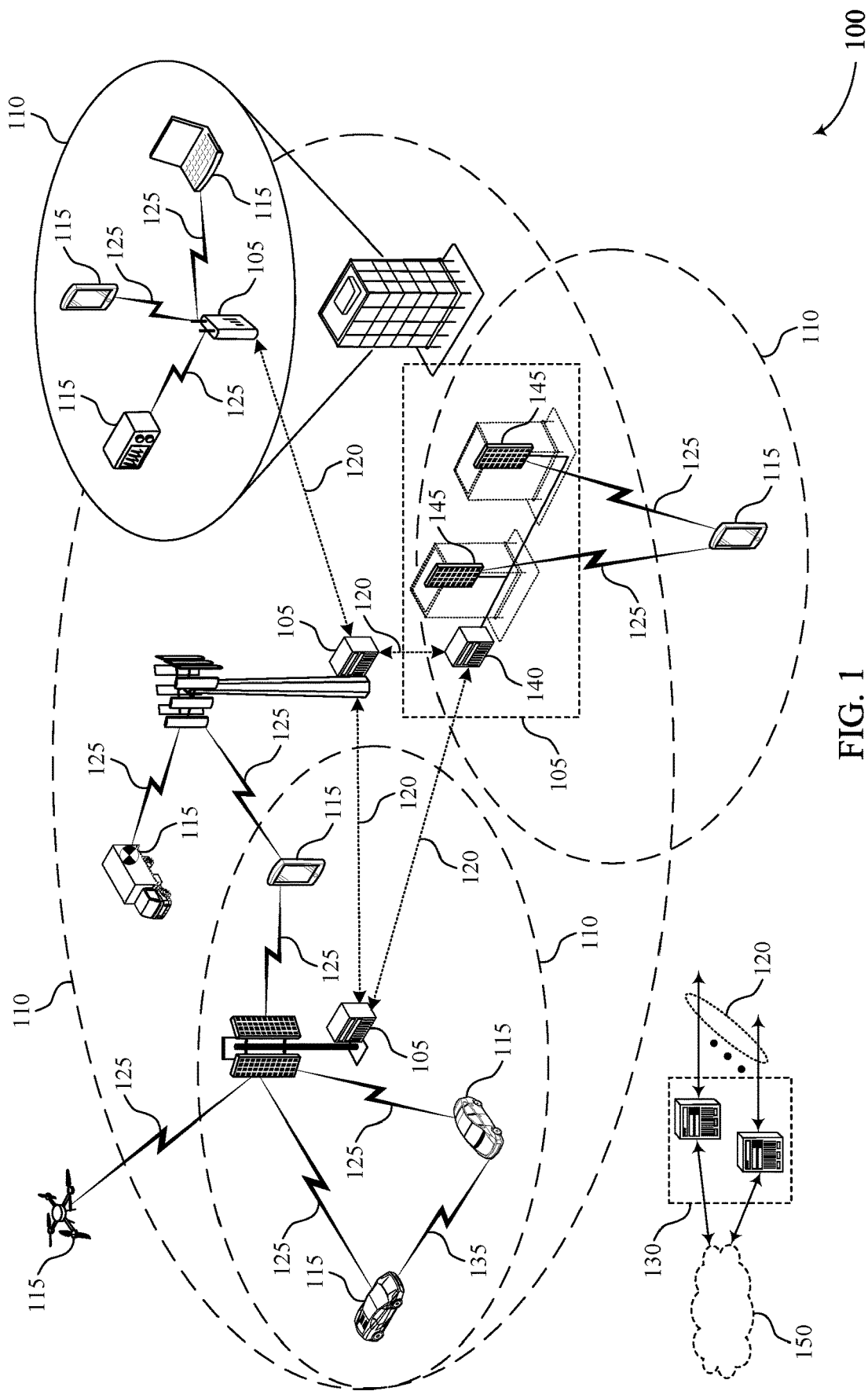
FIG. 1 illustrates an example of a system for wireless communications that supports multi-bit payload transmission with orthogonal sequences in accordance with aspects of the present disclosure.

A user equipment (UE) may communicate with a base station in a wireless communications system. The UE may transmit uplink communications to the base station in a physical uplink control channel (PUCCH). The uplink communications may include uplink control information (UCI). The UCI may include a payload of a number of bits. For example, the UCI may include a two-bit payload (e.g., a two-bit payload of a Format 1 PUCCH message). The two-bit payload may be conveyed using a number of orthogonal frequency division multiplexing (OFDM) symbols.

The UE may convey the payload using codepoints (e.g., sequences). The UE may map elements of a selected sequence to frequency tones within each symbol and across a set of OFDMs symbols configured for conveying the payload. In some cases, the sequences may be non-orthogonal. For example, some wireless communications systems may utilize non-orthogonal sequences because such sequences may be relatively easy to generate or may already be stored or used for other forms of communication. However, the use of non-orthogonal sequences may lead to cross-correlation and interference. This cross-correlation may cause reception errors at a receiving device, such as a base station. The base station may attempt to perform non-coherent reception of the payload, which may be impeded by the cross-correlation. In some wireless communications systems or in some circumstances, such levels of interference caused by non-orthogonal sequences may be acceptable. However, in some cases, such as in ultra-reliable low latency communication (URLLC) transmissions, error caused by the cross-correlation related to the non-orthogonal codepoints may exceed error rate limits.

In accordance with aspects of the present disclosure, the UE may use a set of sequences that are orthogonal to each other as codepoints for conveying the UCI payload. The set of orthogonal sequences may be selected from or derived from an orthogonal matrix. The orthogonal matrix may be a size N orthogonal matrix. The matrix may be or may be derived from a discrete Fourier transform (DFT) matrix of size (N), a Hadamard matrix of size (N), or another orthogonal matrix.

The UE may select a sequence for conveying the payload based on a mapping between the bits of the UCI and the set of orthogonal sequences. The UE may multiplex the selected sequence with another sequence (e.g., a cell-specific sequence). The UE may map the multiplexed sequence to frequency tones and across a set of symbols allocated for conveying the payload.

Once the UE maps the sequence to the physical resources, the UE may transmit the payload in the PUCCH to a base station. The base station may receive the PUCCH and determine the bits of the payload based on the sequence used to convey the payload. The base station may experience less interference caused by cross-correlation based on the payload being conveyed by an orthogonal sequence, thereby improving communications reliability between the UE and the base station.

Aspects of the disclosure are initially described in the context of wireless communications systems. Aspects of the disclosure are then described in the context of circular matrix models and process flows. Aspects of the disclosure are further illustrated by and described with reference to apparatus diagrams, system diagrams, and flowcharts that relate to multi-bit payload transmission with orthogonal sequences.

FIG. 1 illustrates an example of a wireless communications system 100 that supports multi-bit payload transmission with orthogonal sequences in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support URLLC or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support sequence-based transmissions of payloads having multiple bits. For example, a UE 115 may transmit an uplink payload to a base station 105 using orthogonal sequences. The UE 115 may identify a set of sequences configured for conveying a payload including a set of bits, where each sequence of the set of sequences is orthogonal to each other sequence of the set of sequences. The UE 115 may select a first sequence from the set of sequences based on a mapping between the set of sequences and payload values corresponding to the set of bits. The UE 115 may transmit the payload including the set of bits using the first sequence. The described techniques of conveying an uplink multi-bit payload using orthogonal sequences may also be applied to other forms of communication such as downlink communication and sidelink communication.

Figure 2:
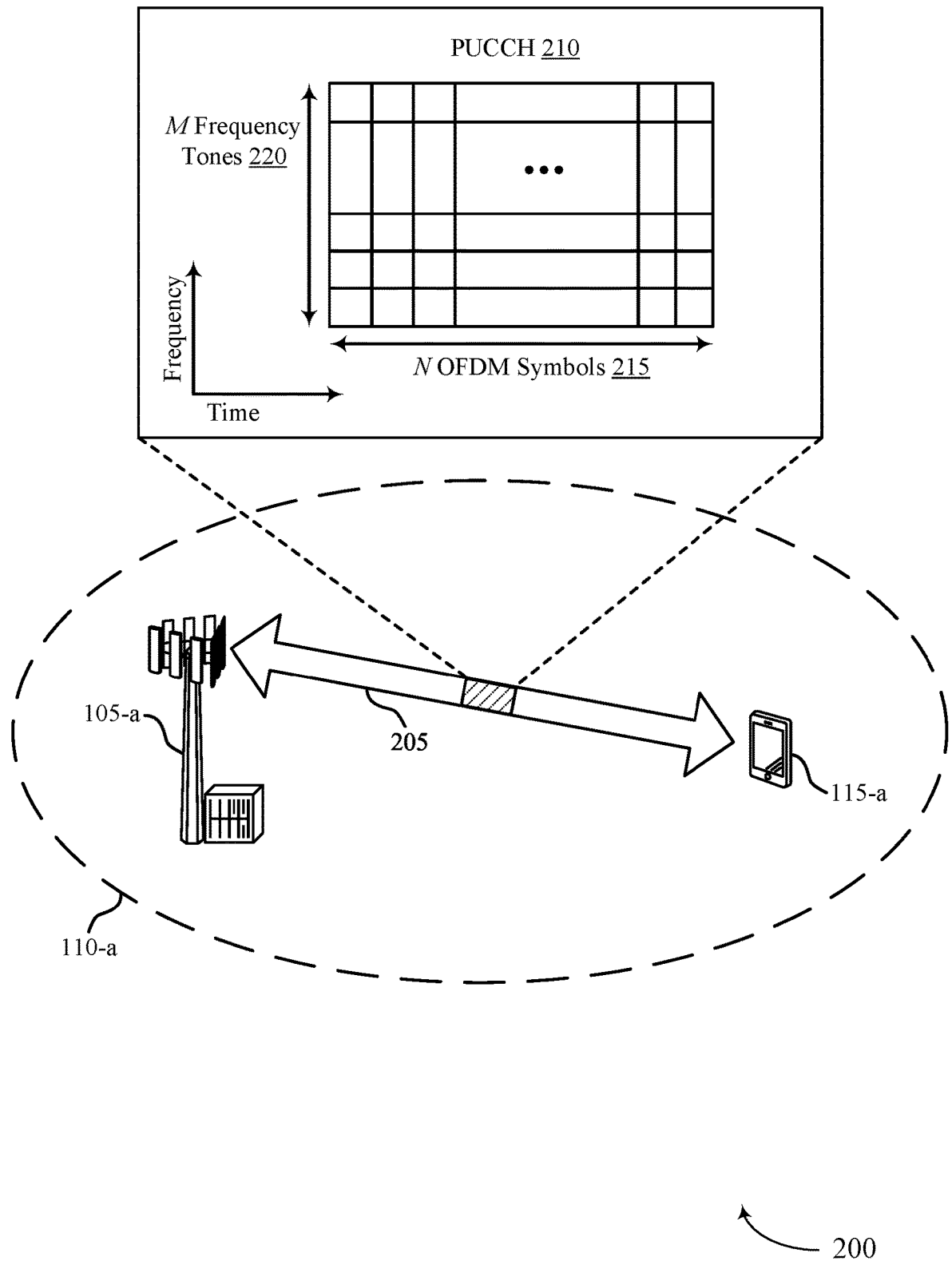
FIG. 2 illustrates an example of a wireless communication system that supports multi-bit payload transmission with orthogonal sequences in accordance with aspects of the present disclosure.

FIG. 2 illustrates an example of a wireless communications system 200 that supports multi-bit payload transmission with orthogonal sequences in accordance with aspects of the present disclosure. In some examples, wireless communications system 200 may implement aspects of wireless communication system 100. Wireless communications system 200 may include UE 115-a, which may be an example of a UE 115 as described with respect to FIG. 1. Wireless communications system 200 may include a base station 105-a, which may be an example of a base station 105 as described with respect to FIG. 1.

Base station 105-a may communicate with UE 115-a in coverage area 110-a. UE 115-a and base station 105-a may communicate over a channel 205. UE 115-a may transmit uplink communications in a PUCCH 210. For example, UE 115-a may transmit UCI in the PUCCH in channel 205. The UCI may include a payload of a number of bits. For example, the UCI may include a two-bit payload (e.g., a two-bit payload of a Format 1 PUCCH message). The two-bit payload may be conveyed using four to fourteen symbols in some cases. In some cases, the UE 115-a may transmit a payload to the base station 105-a other than uplink control information (e.g., reference signal information, data, etc.).

UE 115-a may convey the payload using a codepoint (e.g., sequence) selected from a group of codepoints (e.g., a codebook). UE 115-a may map each N OFDM symbol 215 to a vector entry of a selected sequence, and transmit the signal on the M frequency tones 220 of each OFDM symbol 215. If the sequences are non-orthogonal, the base station 105-a may experience interference due to the cross-correlation between the sequences. This cross-correlation may cause reception errors at a receiving device (e.g., base station 105-a). Base station 105-a may attempt to perform non-coherent reception of the payload, which may be impeded by the cross-correlation. In some cases, such as in URLLC transmissions, error caused by the cross-correlation related to the non-orthogonal codepoints may exceed error rate limits.

In accordance with aspects of the present disclosure, UE 115-a may use sequences that are orthogonal to each other as codepoints for conveying the UCI payload (or any other sequence-based payload or communication). The number of sequences selected may be equal to $2^x$, where x is the number of bits of the UCI payload. For example, for a two-bit payload, four sequences may be selected to convey the four options of a two-bit payload (e.g., 00, 01, 10, and 11). The selected set of sequences may be referred to as a codebook. An indication of the codebook may be signaled between the UE 115-a and base station 105-a. Additionally or alternatively, the UE 115-a and base station 105-a may independently generate the codebook based on a configuration that is signaled or statically configured. As described in more detail herein, the $2^x$ sequences that are selected as codepoints may be selected in such a way to mitigate the effects of doppler shift.

The orthogonal sequences may be selected or otherwise derived from an orthogonal matrix. The orthogonal matrix may be a size N orthogonal matrix, corresponding to the number of OFDM symbols configured for conveying a particular payload (e.g., 14 OFDM symbols). The matrix may be a DFT matrix of size (N), a Hadamard matrix of size (N), or another orthogonal matrix. The sequences selected from an orthogonal matrix for conveying a payload, which can be denoted as Ck, (e.g., C0, C1, C2, and C3 in the case of a two-bit payload) may be mapped to the different bit value combinations (e.g., 00, 01, 10, and 11, respectively). This mapping may be signaled to the UE 115-a, derived by the UE 115-a, or may be stored or statically configured at the UE 115-a.

The sequence Ck may correspond to a row or a column of an orthogonal matrix. UE 115-a may select these rows or columns from an orthogonal matrix as codepoints to use to convey the UCI payload. For example, four sequences may correspond to four rows (or four columns) from an orthogonal matrix.

An example N size DFT matrix may be:

$$W = \frac{1}{\sqrt{N}} \begin{bmatrix} 1 & 1 & 1 & 1 & \cdots & 1 \\ 1 & \omega & \omega^2 & \omega^3 & \cdots & \omega^{N-1} \\ 1 & \omega^2 & \omega^4 & \omega^6 & \cdots & \omega^{2(N-1)} \\ 1 & \omega^3 & \omega^6 & \omega^9 & \cdots & \omega^{3(N-1)} \\ \vdots & \vdots & \vdots & \vdots & \ddots & \vdots \\ 1 & \omega^{N-1} & \omega^{2(N-1)} & \omega^{3(N-1)} & \cdots & \omega^{(N-1)(N-1)} \end{bmatrix}$$

(Row → ; Column ↓)

Once the UE 115-a selects a sequence for conveying a payload (e.g., C0 for conveying the bit value 00), the UE 115-a may multiplex the selected sequence Ck with another sequence (e.g., a cell-specific sequence S). The UE 115-a may then map the multiplexed sequence to frequency tones within each OFDM symbol and across the set of OFDM symbols that are configured for conveying the payload. This mapping may be performed for the UCI payload in PUCCH 210 for a single resource block (e.g., for each of the twelve frequency tones 220 and across the OFDM symbols i).

Thus, the transmitted signal Xk may be represented by Xk(i)=Ck(i)*S, where Ck is the selected codepoint (e.g., sequence from the orthogonal DFT matrix), and S is the cell-specific sequence, which may be a quadrature phase-shift keying (QPSK) sequence or some other vector having a length corresponding to the number of frequency tones allocated for a symbol (e.g., twelve), and i is the OFDM symbol 215 index (e.g., of fourteen OFDM symbols 215). In some cases, the bit value of the UCI payload may be two bits. For example, the bit value of the UCI payload may be b=00. In this case, the mapping may correspond to k=0 (i.e., the selected sequence C0. So the mapping of the generated signal Xk to the physical resources may be represented as shown in Table 1:

TABLE 1

Example Sequence Mapping with Cell-Specific Sequence

| | OFDM symbol 0 | OFDM symbol 1 | ... | OFDM symbol 13 |
|---|---|---|---|---|
| Tone 0 | Ck(0) * S(0) | Ck(1) * S(0) | ... | Ck(13) * S(0) |
| Tone 1 | Ck(0) * S(1) | Ck(1) * S(1) | ... | Ck(13) * S(1) |
| Tone 2 | Ck(0) * S(2) | Ck(1) * S(2) | ... | Ck(13) * S(2) |
| Tone 3 | Ck(0) * S(3) | Ck(1) * S(3) | ... | Ck(13) * S(3) |
| Tone 4 | Ck(0) * S(4) | Ck(1) * S(4) | ... | Ck(13) * S(4) |
| Tone 5 | Ck(0) * S(5) | Ck(1) * S(5) | ... | Ck(13) * S(5) |
| Tone 6 | Ck(0) * S(6) | Ck(1) * S(6) | ... | Ck(13) * S(6) |
| Tone 7 | Ck(0) * S(7) | Ck(1) * S(7) | ... | Ck(13) * S(7) |
| Tone 8 | Ck(0) * S(8) | Ck(1) * S(8) | ... | Ck(13) * S(8) |
| Tone 9 | Ck(0) * S(9) | Ck(1) * S(9) | ... | Ck(13) * S(9) |
| Tone 10 | Ck(0) * S(10) | Ck(1) * S(10) | ... | Ck(13) * S(10) |
| Tone 11 | Ck(0) * S(11) | Ck(1) * S(11) | ... | Ck(13) * S(11) |

In order to generate the OFDM signal Xk, UE 115-a may make various determinations. First, UE 115-a may determine which four rows or columns to use in the orthogonal matrix of size (N) (e.g., C0, C1, C2, and C3). In a first case, UE 115-a may use any randomly selected different four rows or columns. In another case, UE 115-a may use four rows or columns with a largest gap between the row or column index from the orthogonal matrix (as described with respect to FIG. 3). This selection process may lead to a low peak-to average power ration (PAPR) or may otherwise mitigate doppler shift effects, thereby increasing reception quality at the receiver (e.g., base station 105-a).

In another example, the transmitted signal Xk may be generated directly from an orthogonal matrix rather than being derived from multiplexing an orthogonal sequence with a cell-specific sequence S. In this example, X1, X2, X3, and X4 may represent four different rows or columns from an orthogonal matrix of size (N*M), where N is the number of OFDM symbols 215 (e.g., fourteen OFDM symbols 215), and where M is the number of frequency tones 220 (e.g., twelve frequency tones 220). A sequence Xk may be selected from an orthogonal matrix, where each possible Xk sequence may be a QPSK vector or sequence of length (N*M). For example, each Xk sequence is 168 entries long. Selecting a set of sequences from the orthogonal matrix to form the codebook may be performed as described herein (and as further described with reference to FIG. 3). Similarly, the process of selecting a sequence from the codebook to convey a particular bit value based on a mapping between the different bit values and the different sequences from the codebook may be performed as described herein. When the UE 115-a maps a selected sequence Xk to the physical resources of a resource block, each frequency tones 220 from each OFDM symbols 215 may be mapped to one entry of the sequence Xk.

Table 2 illustrates an example of mapping a sequence Xk to the M frequency tones 220 and N OFDM symbols 215 of a resource block. The mapping shown in Table 2 may be an example of a time first (e.g., OFDM symbol 215) and frequency second (e.g., frequency tone 220) mapping. For example, OFDM symbol 0 and each tone of OFDM symbol 0 are mapped first to the entries of sequence Xk, before moving to OFDM symbol 1.

TABLE 2

Example Sequence Mapping without a Cell-Specific Sequence

|  | OFDM symbol 0 | OFDM symbol 1 | . . . | OFDM symbol 13 |
|---|---|---|---|---|
| Tone 0 | Xk(0) | Xk(12) | . . . | Xk(156) |
| Tone 1 | Xk(1) | Xk(13) | . . . | Xk(157) |
| Tone 2 | Xk(2) | Xk(14) | . . . | Xk(158) |
| Tone 3 | Xk(3) | Xk(15) | . . . | Xk(159) |
| Tone 4 | Xk(4) | Xk(16) | . . . | Xk(160) |
| Tone 5 | Xk(5) | Xk(17) | . . . | Xk(161) |
| Tone 6 | Xk(6) | Xk(18) | . . . | Xk(162) |
| Tone 7 | Xk(7) | Xk(19) | . . . | Xk(163) |
| Tone 8 | Xk(8) | Xk(20) | . . . | Xk(164) |
| Tone 9 | Xk(9) | Xk(21) | . . . | Xk(165) |
| Tone 10 | Xk(10) | Xk(22) | . . . | Xk(166) |
| Tone 11 | Xk(11) | Xk(23) | . . . | Xk(167) |

Alternatively, the mapping may be a frequency first and time second mapping (not shown). In this case, a first frequency tone 220 of each OFDM symbol 215 may be mapped first to each entry of the sequence Xk, before mapping the next frequency tone 220.

Thus, once UE 115-a generates the OFDM signal in one RB, either with using the cell-specific sequence or without, UE 115-a may transmit PUCCH 210 using a selected orthogonal sequence to convey a UCI payload (e.g., a two-bit UCI payload). Base station 105-a may receive the PUCCH 210, and decode the payload based on the sequence used to convey the signal.

Figure 3:
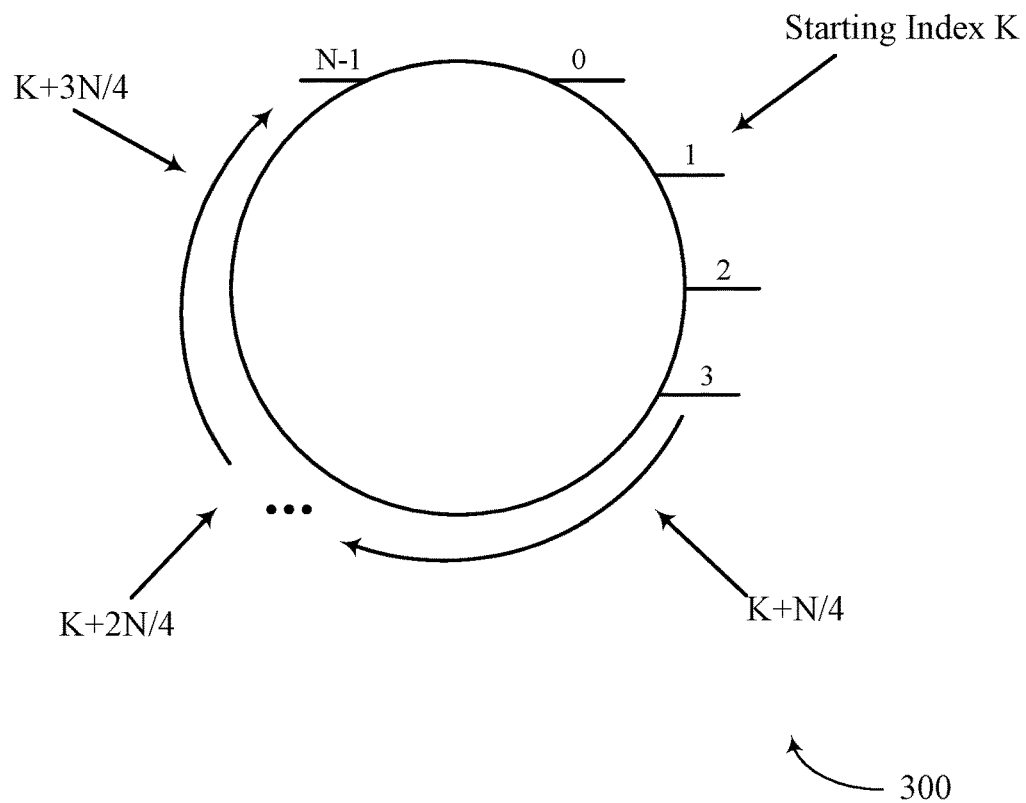
FIG. 3 illustrates an example of a circular matrix model that supports multi-bit payload transmission with orthogonal sequences in accordance with aspects of the present disclosure.

FIG. 3 illustrates an example of a circular matrix model 300 that supports multi-bit payload transmission with orthogonal sequences in accordance with aspects of the present disclosure. In some examples, circular matrix model 300 may implement aspects of wireless communication system 100. A UE 115 or other wireless device may utilize circular matrix model 300 to select columns 310 or rows 315 of an orthogonal matrix 305, as described with respect to FIG. 2, to generate a codebook for conveying a UCI payload transmission (or some other sequence-based transmission of a multi-bit payload).

The index values for the rows and columns of an orthogonal matrix 305 may be mapped to circular matrix model 300. The orthogonal matrix 305 may be an example of a DFT matrix or a Hadamard matrix (or some other orthogonal matrix), and may be used for generating sequences for conveying a UCI payload, such as a two-bit UCI payload. The values shown in orthogonal matrix 305 are example values for illustrative purposes.

In circular matrix model 300, the indices of the rows 315 or columns 310 of orthogonal matrix 305 of size N may be placed on a circle. The indices may be numbered from 0 to N−1. A UE 115 may use a starting index and an index interval to select rows 315 or columns 310 of the matrix 305 from circular matrix model 300. In some cases, a base station 105 may transmit an indication to a UE 115 of a starting index value K, as well as an indication of an indexing interval, such as a function of N (e.g., the number of OFDM symbols configured for conveying a payload, as described with reference to FIG. 2) and the number of sequences needed to generate the codebook (e.g., 4 in the case of a two-bit payload). In other cases, a UE 115 may be pre-configured with the starting index K and/or the indexing interval (e.g., N/4), or the UE 115 may derive the starting index K and/or the indexing interval. In an example, a starting index K may be 1, and the index interval may be N/4. Thus, a first column 310 or row 315 corresponding to index 1 may be selected as a first sequence of the codebook, a second column or row K+N/4 may be selected (i.e., row or column with index 4) as a second sequence, a third column or row K+(2N)/4 may be selected (i.e., row or column with index 7) as a third sequence, and a fourth column or row (K+(3N)/4 may be selected (i.e., row or column with index 10) as the fourth sequence.

In some cases, the N number of columns 310 or rows 315 cannot be evenly divided by the number of sequences needed for the codebook (e.g., if N=13 OFDM symbols and 4 sequences were needed to convey a two-bit payload). In this case, a rounding operation, such as a floor operation, a ceiling operation, or a modulo operation, or some combination of these operations, may be used to determine approximately evenly spaced columns 310 or rows 315 of the orthogonal matrix 305 around the circle of circular matrix model 300. For example, the UE 115 may use a floor operation for each index interval by selecting column 310 or row 315 indices as {K, mod(K+floor(N/4), N), mod(K+floor (N/4), N), mod(K+floor(N/4), N)}. Alternatively, the UE 115 may use a ceiling operation for each index interval by selecting column 310 or row 315 indices as {K, mod(K+ceiling(N/4), N), mod(K+ceiling(2 N/4), N), mod(K+ceiling(3 N/4), N)}. Alternatively, the UE 115 may use a mix of floor and ceiling operations by selecting the column 310 or row 315 indices as {k, mod(k+floor(N/4), N), mod(K+ceil(2 N/4), N), mod(K+floor(3 N/4), N)})}. The index interval used by the UE 115 (e.g., the function(s) used to derive the interval and/or the parameters used in the function) may be signaled to the UE 115 by a base station 105. Additionally or alternatively, the function(s) and/or parameters used by the UE 115 to determine the index interval may be determined or otherwise derived by the UE 115 based on a static configuration or otherwise in such a way to maximize the distance (i.e., circular distance between intervals on the circle of circular matrix model 300).

After selecting the sequences from the orthogonal matrix using one or more of the techniques described with reference to FIG. 3, the UE 115 may generate the OFDM signal Xk and map the signal to physical resources for transmitting the payload, as described with reference to FIG. 2.

Figure 4:
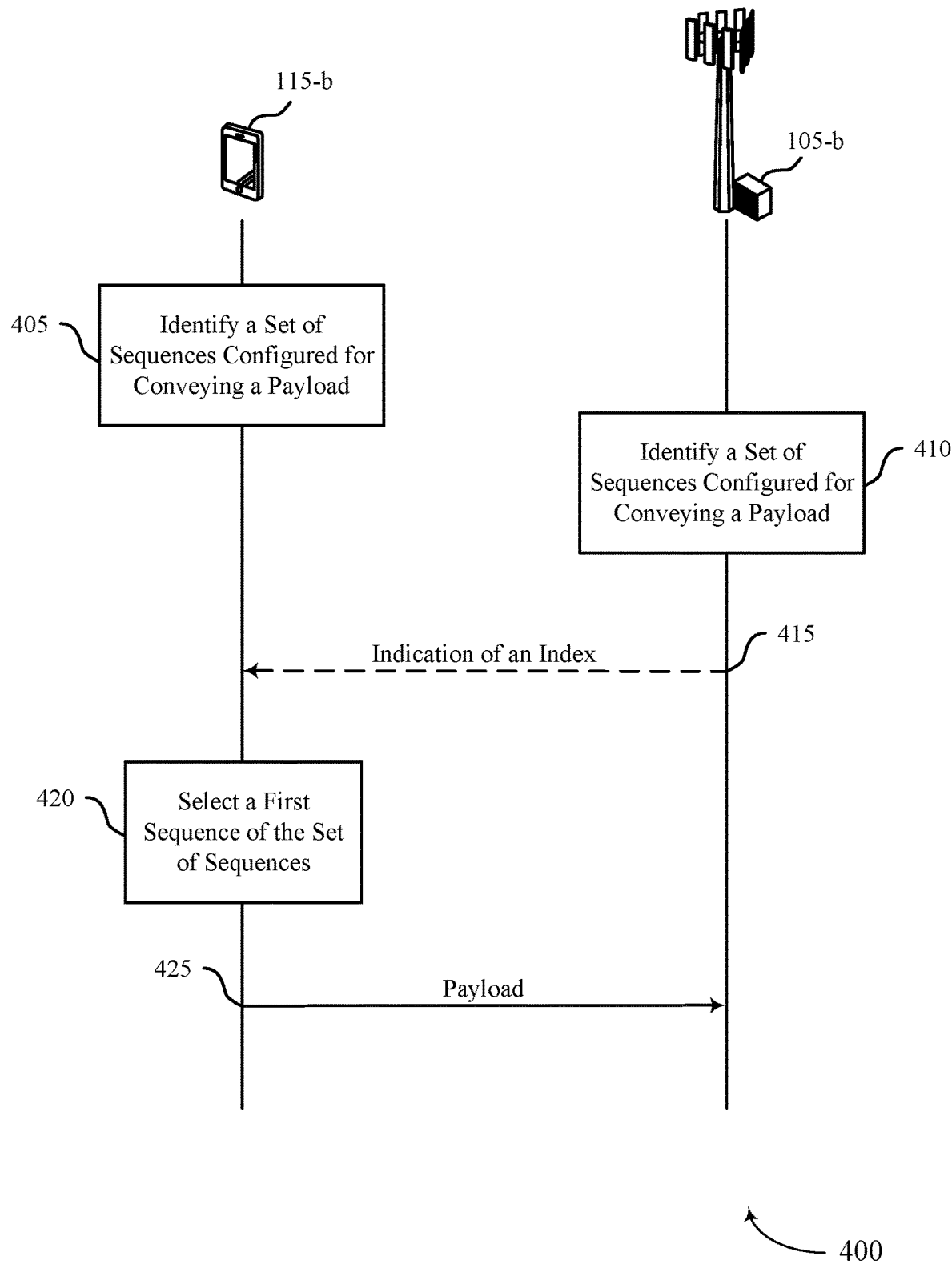
FIG. 4 illustrates an example of a process flow that supports multi-bit payload transmission with orthogonal sequences in accordance with aspects of the present disclosure.

FIG. 4 illustrates an example of a process flow 400 that supports multi-bit payload transmission with orthogonal sequences in accordance with aspects of the present disclosure. In some examples, process flow 400 may implement aspects of wireless communication systems 100 and 200 and/or the sequence selection techniques described with reference to FIG. 3. Process flow 400 may include a UE 115-b that may be an example of a UE 115 as described herein. Process flow 400 may also include a base station 105-b that may be an example of a base station 105 as described herein.

At 405, UE 115-b may identify a set of sequences configured for conveying a payload including a set of bits, where each sequence of the set of sequences is orthogonal to each other sequence of the set of sequences. The set of sequences may be referred to as a codebook, and may be selected or derived from an orthogonal matrix, as described with reference to FIGS. 2-3. In a similar way, at 410, base station 105-b may identify a set of sequences configured for conveying a payload including a set of bits, where each sequence of the set of sequences is orthogonal to each other sequence of the set of sequences.

In some cases, at 415, base station 105-b may transmit an indication of an index. For example, base station 105-b may transmit a starting index associated with an orthogonal matrix including the set of sequences (e.g., index K as described with reference to FIG. 3). Base station 105-b may also transmit an indication of an index interval associated with an orthogonal matrix including the set of sequences (e.g., an indication of the function(s) and/or parameters for calculating the index interval, as described with reference to FIG. 3). UE 115-b may receive the indication of the starting index, the index interval, or both. In other cases, the starting index or the index interval, or both, may be preconfigured or autonomously derived by the UE 115-b.

UE 115-b may identify a starting index associated with an orthogonal matrix including the set of sequences (e.g., based on an indication from base station 105-b or based on a pre-configuration). The UE 115-b may also identify an index interval associated with the orthogonal matrix including the set of sequences. UE 115-b may determine the set of sequences from the orthogonal matrix based on the starting index and the index interval. The index interval may include a function of the number of the set of sequences and a number of columns in the orthogonal matrix. The function may include a division of the number of columns in the matrix by the number of the set of sequences. The function may also include a modulo function, a floor function, a ceiling function, or a combination of these. Further, the number of the set of sequences may be equal to two raised to a number of bits of the set of bits. For example, the number of the set of sequences may be equal to $2^x$, where x is the number of bits of the set of bits. The orthogonal matrix may include a DFT matrix or a Hadamard matrix.

UE 115-b may determine the set of sequences from an orthogonal matrix including the set of sequences based on a random selection.

At 420, UE 115-b may select a first sequence from the set of sequences based on a mapping between the set of sequences and payload values corresponding to the set of bits (e.g., selecting a sequence C0 based on it being mapped to the bit value 00, as described with reference to FIG. 2).

In some cases, UE 115-b may map, for each frequency tone of a set of frequency tones, each entry of a set of entries of a vector corresponding to the first sequence to each time period of a set of time periods. UE 115-b may then map, for each time period, of the set of time periods, a multiplication of each entry of the vector corresponding to the first sequence and a cell-specific sequence across the set of frequency tones.

In some cases, UE 115-b may identify an orthogonal matrix including the set of sequences, where a size of the matrix may be based on a number of a set of time periods configured for transmitting the payload and a number of a set of frequency tones configured for transmitting the payload. In these cases, UE 115-b may map a vector corresponding to the first sequences across the set of time periods and across the set of frequency tones according to a time first and a frequency separate mapping. Alternatively, UE 115-b may map a vector corresponding to the first sequence across the set of time periods and across the set of frequency tones according to a frequency first and time second mapping. UE 115-b may identify an orthogonal matrix including the set of sequences, where a size of the orthogonal matrix is based on a number of a set of time periods configured for transmitting the payload.

At 425, UE 115-b may transmit the payload, including the set of bits using the first sequence. The payload may include a UCI message including two bits.

Figure 5:
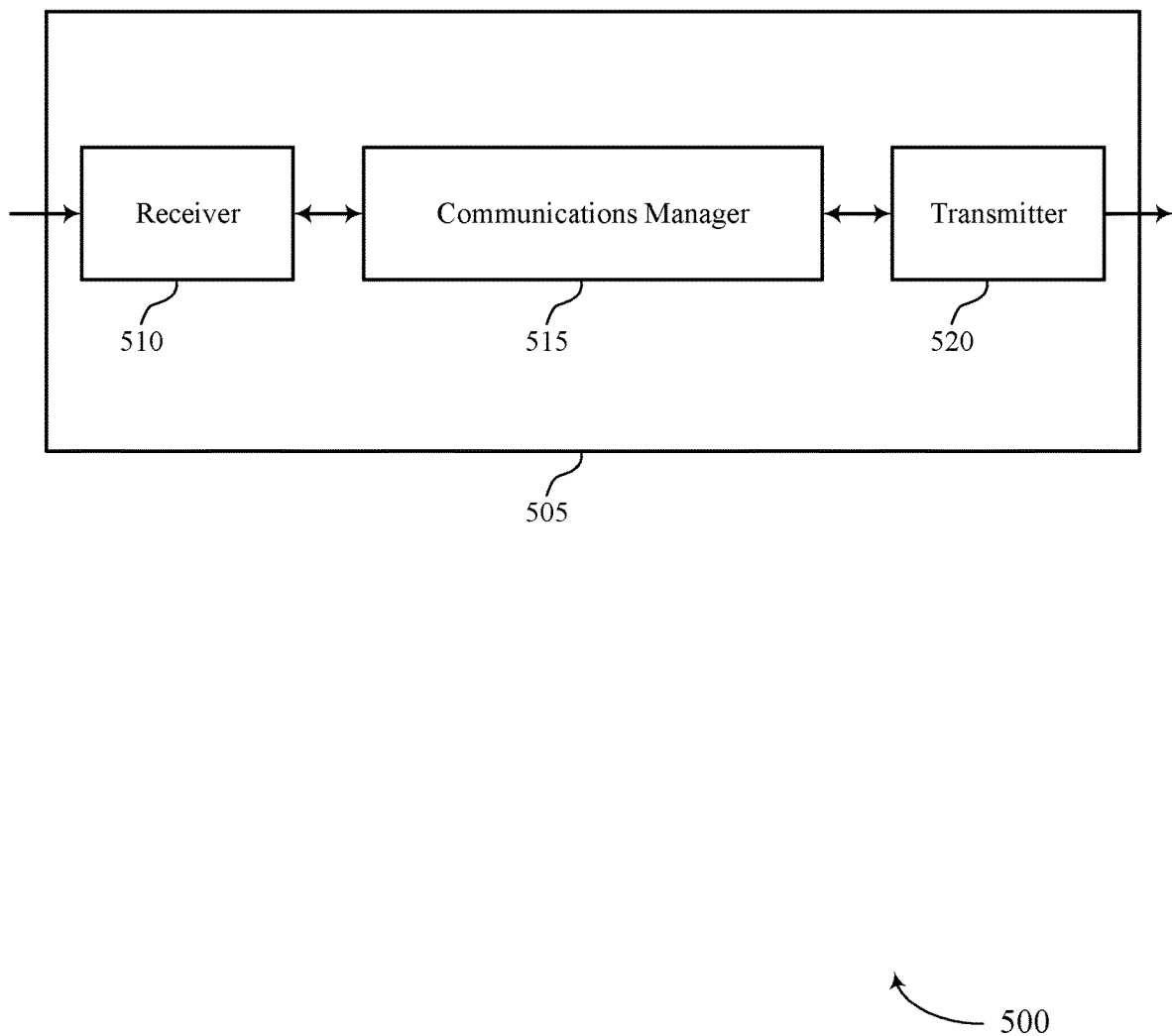
FIGS. 5 and 6 show block diagrams of devices that support multi-bit payload transmission with orthogonal sequences in accordance with aspects of the present disclosure.

FIG. 5 shows a block diagram 500 of a device 505 that supports multi-bit payload transmission with orthogonal sequences in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to multi-bit payload transmission with orthogonal sequences, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a set of sequences configured for conveying a payload including a set of bits, where each sequence of the set of sequences is orthogonal to each other sequence of the set of sequences, select a first sequence from the set of sequences based on a mapping between the set of sequences and payload values corresponding to the set of bits, and transmit the payload including the set of bits using the first sequence. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a filed-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The actions performed by the communications manager 515 as described herein may be implemented to realize one or more potential advantages. One implementation may allow a UE 115 to save power and increase battery life by decreasing the likelihood of interference at a receiving device. By decreasing interference at a device that receives communications from the UE 115 (such as a base station), communications reliability may be improved, which may decrease the number of retransmissions by either the UE 115 or the base station 105, thereby saving power and increasing battery life at the UE 115.

Figure 6:
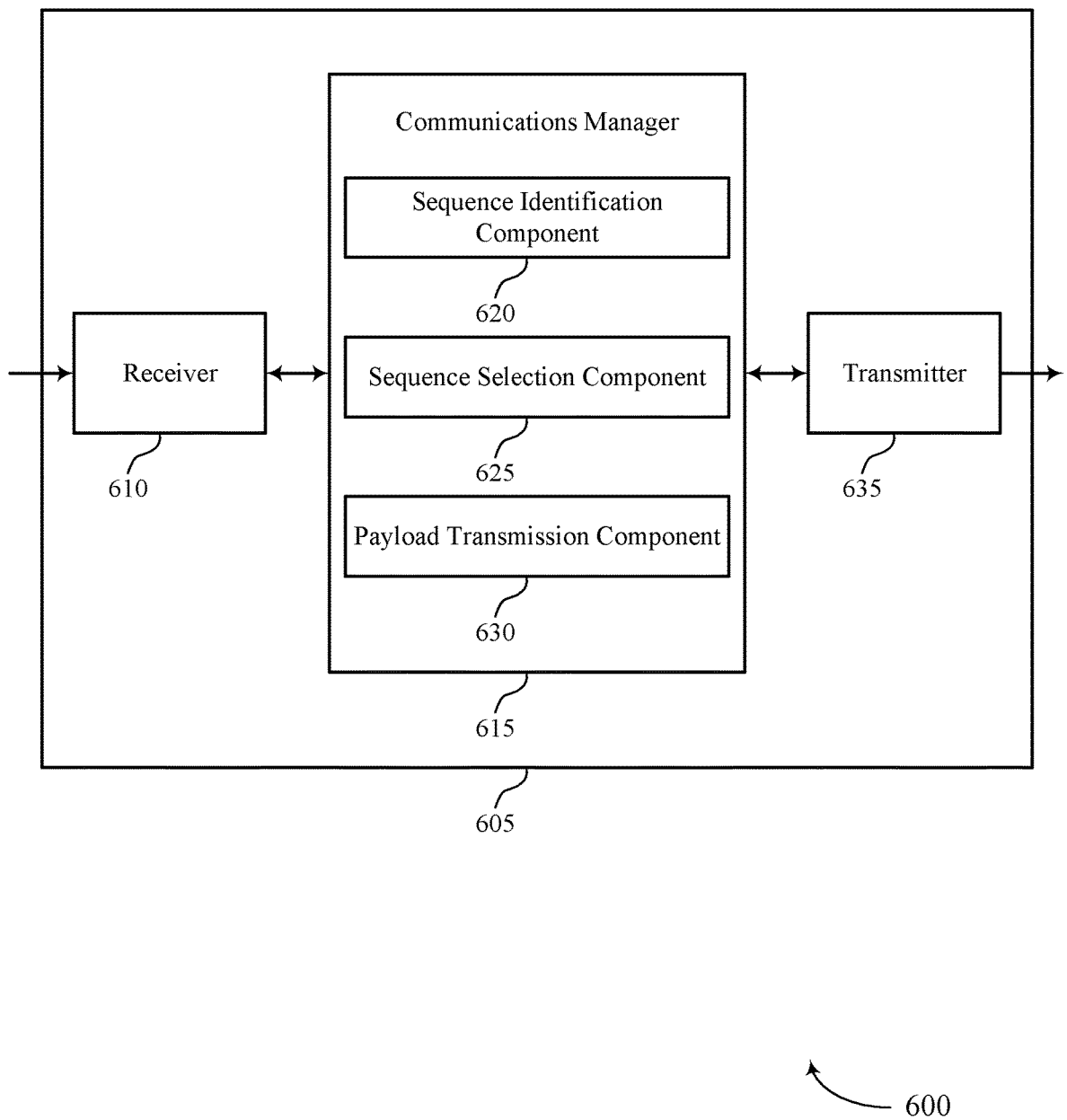

FIG. 6 shows a block diagram 600 of a device 605 that supports multi-bit payload transmission with orthogonal sequences in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to multi-bit payload transmission with orthogonal sequences, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a sequence identification component 620, a sequence selection component 625, and a payload transmission component 630. The communications manager 615 may be an example of aspects of the communications manager 810 described herein.

The sequence identification component 620 may identify a set of sequences configured for conveying a payload including a set of bits, where each sequence of the set of sequences is orthogonal to each other sequence of the set of sequences.

The sequence selection component 625 may select a first sequence from the set of sequences based on a mapping between the set of sequences and payload values corresponding to the set of bits.

The payload transmission component 630 may transmit the payload including the set of bits using the first sequence.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

A processor of a UE 115 (e.g., controlling the receiver 610, the transmitter 635, or the transceiver 820 as described with reference to FIG. 8) may efficiently operate the components described herein to save power and increase battery life of the UE 115. The processor of the UE 115 may control the components described herein to identify a set of sequences configured for conveying a payload including a set of bits. The identified set of sequences may be orthogonal to each other sequence of the set of sequences. The processor of the UE 115 may also control the components to select a first sequence from the set of sequences based on a mapping between the set of sequences, and payload values corresponding to the set of bits. The processor of the UE 115 may then operate the transmitter 635 to transmit the payload, including the set of bits using the first sequence. Thus, the processor of the UE 115 may operate the components to improve communications reliability of the UE 115 and decrease cross-correlation of signals transmitted by the UE 115, as the processor selects orthogonal sequences for payload transmission.

Figure 7:
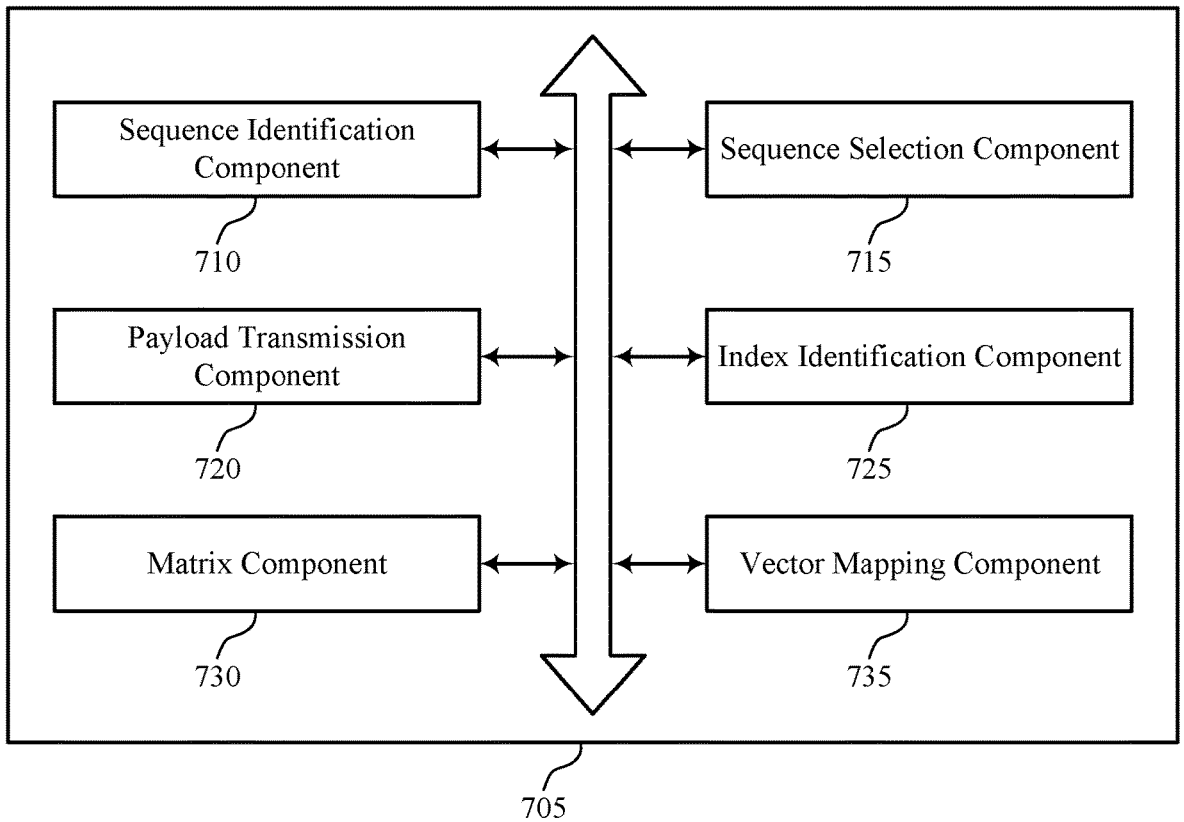
FIG. 7 shows a block diagram of a communications manager that supports multi-bit payload transmission with orthogonal sequences in accordance with aspects of the present disclosure.

FIG. 7 shows a block diagram 700 of a communications manager 705 that supports multi-bit payload transmission with orthogonal sequences in accordance with aspects of the present disclosure. The communications manager 705 may be an example of aspects of a communications manager 515, a communications manager 615, or a communications manager 810 described herein. The communications manager 705 may include a sequence identification component 710, a sequence selection component 715, a payload transmission component 720, an index identification component 725, a matrix component 730, and a vector mapping component 735. Each of these modules may communicate, directly or indirectly, with one another (e.g., via one or more buses).

The sequence identification component 710 may identify a set of sequences configured for conveying a payload including a set of bits, where each sequence of the set of sequences is orthogonal to each other sequence of the set of sequences. In some examples, the sequence identification component 710 may determine the set of sequences from the orthogonal matrix based on the starting index and the index interval. In some cases, the set of sequences includes four sequences.

The sequence selection component 715 may select a first sequence from the set of sequences based on a mapping between the set of sequences and payload values corresponding to the set of bits. In some cases, the number of the set of sequences is equal to two raised to a number of bits of the set of bits.

The payload transmission component 720 may transmit the payload including the set of bits using the first sequence. In some cases, the payload including the set of bits includes an uplink control information message including two bits.

The index identification component 725 may identify a starting index associated with an orthogonal matrix including the set of sequences. In some examples, the index identification component 725 may identify an index interval associated with the orthogonal matrix including the set of sequences. In some examples, the index identification component 725 may receive an indication of the starting index, an indication of the index interval, or both. In some cases, the index interval includes a function of the number of the set of sequences and a number of columns in the orthogonal matrix. In some cases, the function includes a division of the number of columns in the matrix by the number of the set of sequences. In some cases, the function further includes a modulo function, a floor function, a ceiling function, or a combination thereof.

The matrix component 730 may determine the set of sequences from an orthogonal matrix including the set of sequences based on a random selection. In some examples, the matrix component 730 may identify an orthogonal matrix including the set of sequences, where a size of the orthogonal matrix is based on a number of a set of time periods configured for transmitting the payload and a number of a set of frequency tones configured for transmitting the payload. In some examples, the matrix component 730 may identify an orthogonal matrix including the set of sequences, where a size of the orthogonal matrix is based on a number of a set of time periods configured for transmitting the payload. In some cases, the orthogonal matrix includes a discrete Fourier transform (DFT) matrix or a Hadamard matrix.

The vector mapping component 735 may map, for each frequency tone of a set of frequency tones, each entry of a set of entries of a vector corresponding to the first sequence to each time period of a set of time periods. In some examples, the vector mapping component 735 may map, for each time period of the set of time periods, a multiplication of each entry of the vector corresponding to the first sequence and a cell-specific sequence across the set of frequency tones. In some examples, the vector mapping component 735 may map a vector corresponding to the first sequence across the set of time periods and across the set of frequency tones according to a time first and frequency second mapping. In some examples, the vector mapping component 735 may map a vector corresponding to the first sequence across the set of time periods and across the set of frequency tones according to a frequency first and time second mapping.

Figure 8:
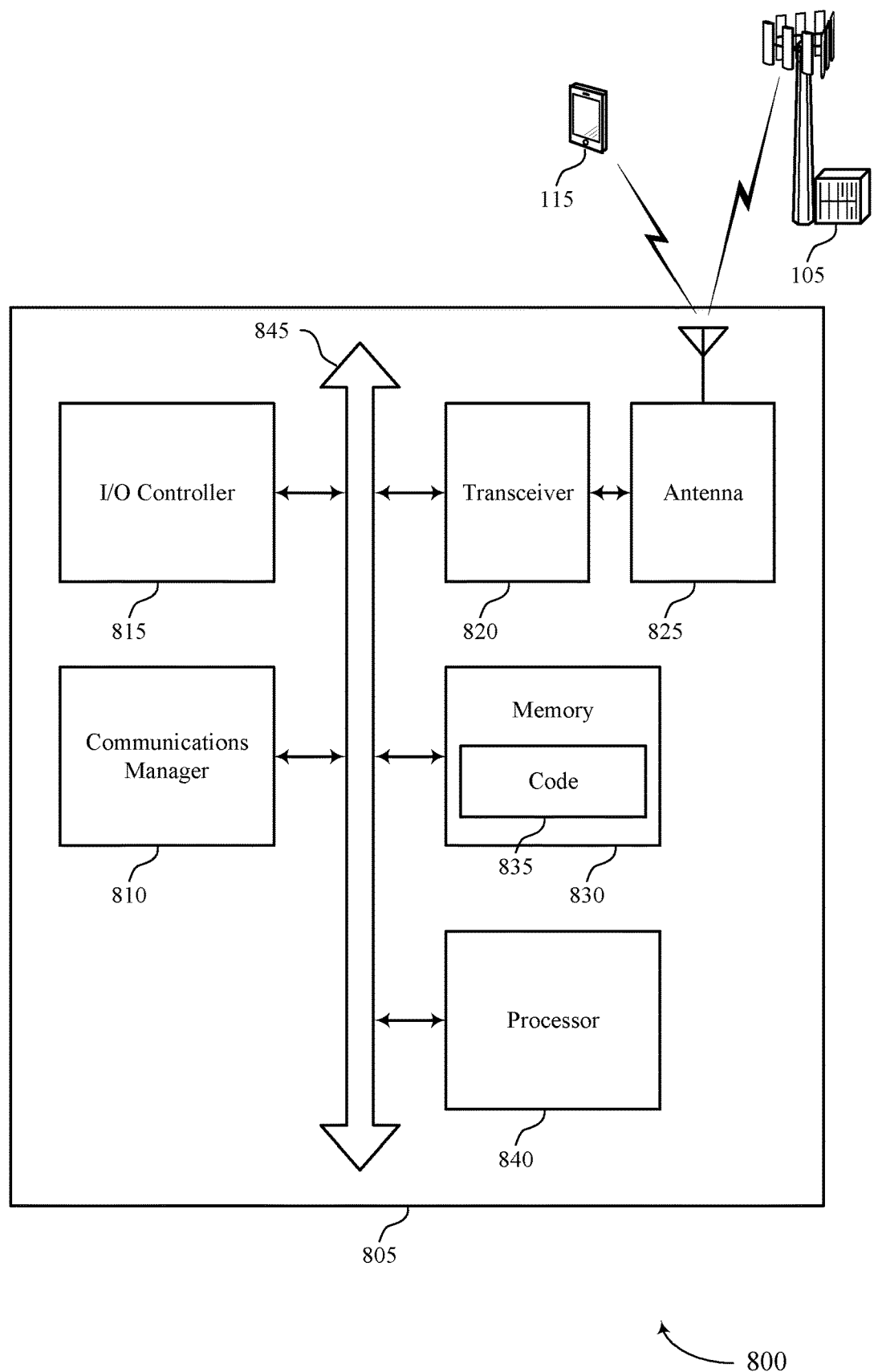
FIG. 8 shows a diagram of a system including a device that supports multi-bit payload transmission with orthogonal sequences in accordance with aspects of the present disclosure.

FIG. 8 shows a diagram of a system 800 including a device 805 that supports multi-bit payload transmission with orthogonal sequences in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a set of sequences configured for conveying a payload including a set of bits, where each sequence of the set of sequences is orthogonal to each other sequence of the set of sequences, select a first sequence from the set of sequences based on a mapping between the set of sequences and payload values corresponding to the set of bits, and transmit the payload including the set of bits using the first sequence.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting multi-bit payload transmission with orthogonal sequences).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
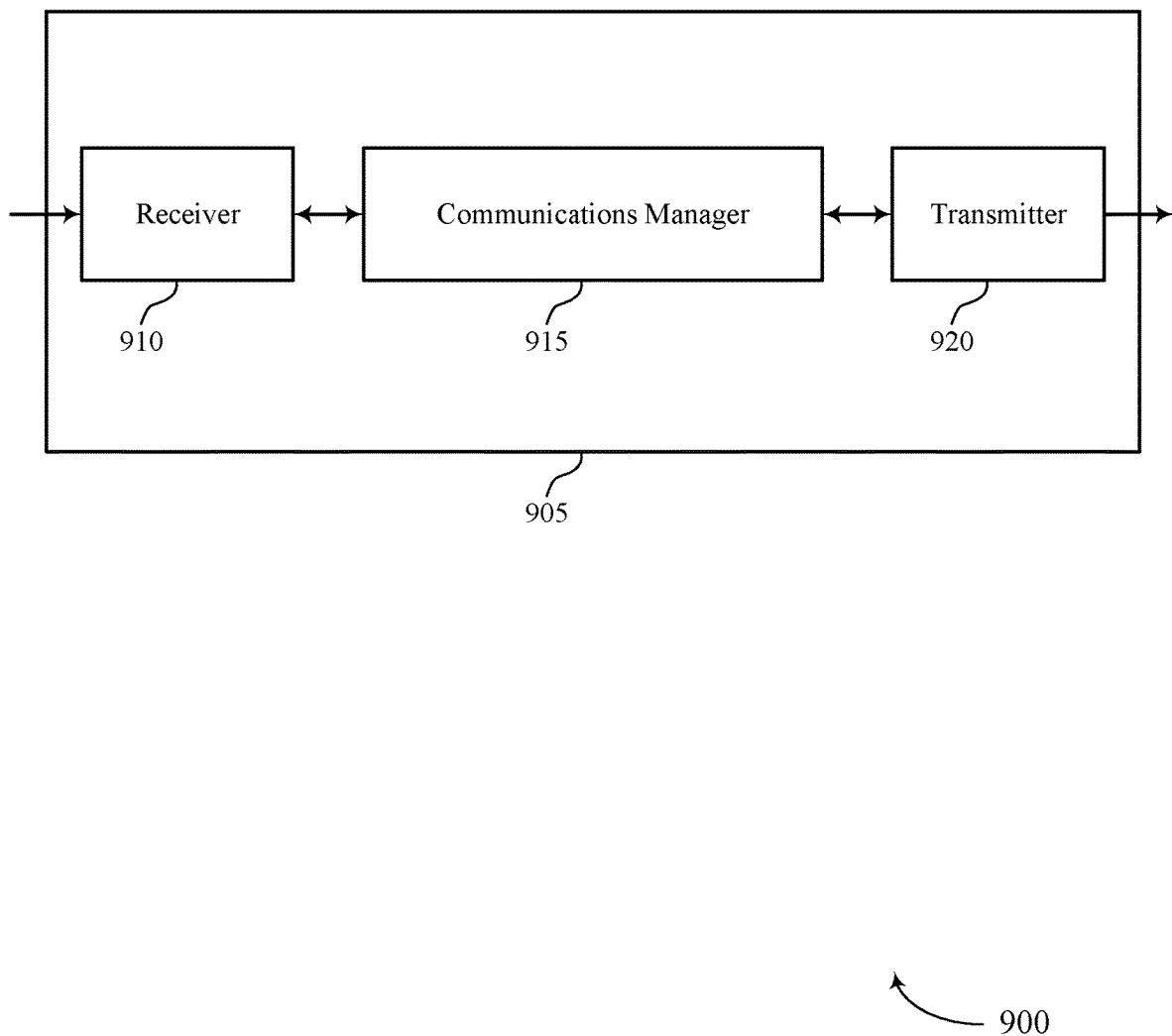
FIGS. 9 and 10 show block diagrams of devices that support multi-bit payload transmission with orthogonal sequences in accordance with aspects of the present disclosure.

FIG. 9 shows a block diagram 900 of a device 905 that supports multi-bit payload transmission with orthogonal sequences in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to multi-bit payload transmission with orthogonal sequences, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a set of sequences configured for conveying a payload including a set of bits, where each sequence of the set of sequences is orthogonal to each other sequence of the set of sequences and receive the payload including the set of bits using a first sequence from the set of sequences, the first sequence based on a mapping between the set of sequences and payload values corresponding to the set of bits. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
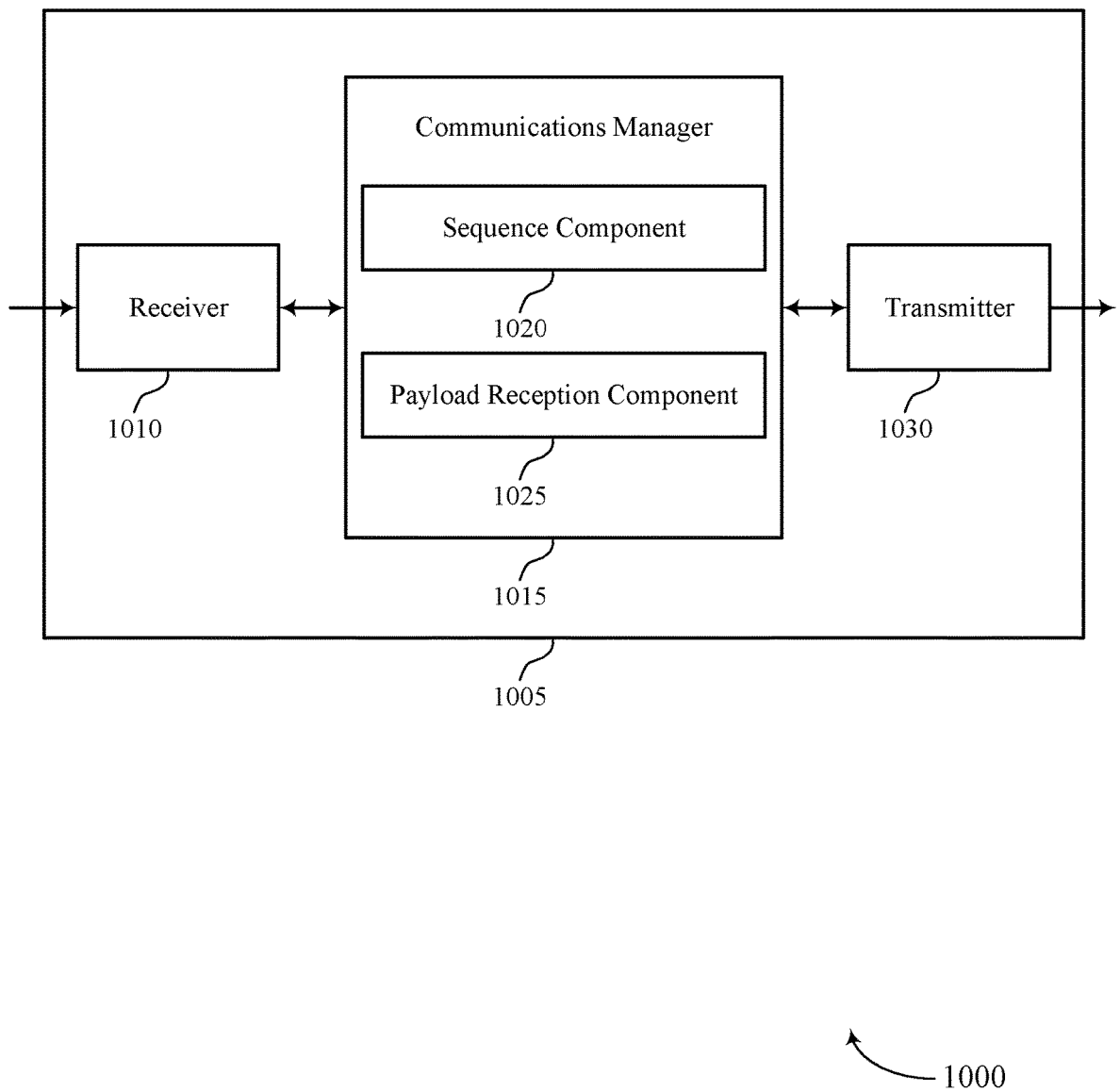

FIG. 10 shows a block diagram 1000 of a device 1005 that supports multi-bit payload transmission with orthogonal sequences in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to multi-bit payload transmission with orthogonal sequences, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a sequence component 1020 and a payload reception component 1025. The communications manager 1015 may be an example of aspects of the communications manager 1210 described herein.

The sequence component 1020 may identify a set of sequences configured for conveying a payload including a set of bits, where each sequence of the set of sequences is orthogonal to each other sequence of the set of sequences.

The payload reception component 1025 may receive the payload including the set of bits using a first sequence from the set of sequences, the first sequence based on a mapping between the set of sequences and payload values corresponding to the set of bits.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
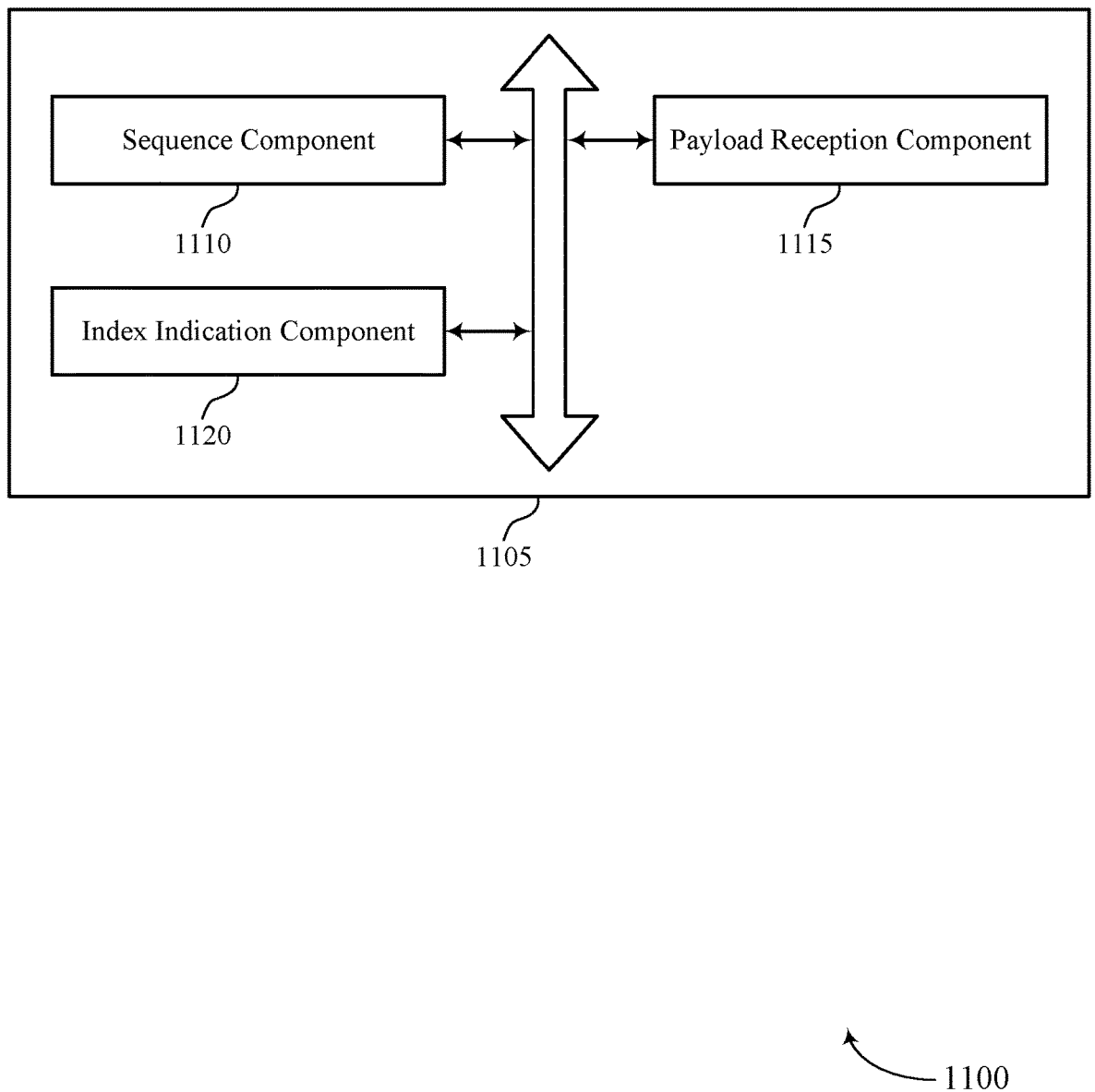
FIG. 11 shows a block diagram of a communications manager that supports multi-bit payload transmission with orthogonal sequences in accordance with aspects of the present disclosure.

FIG. 11 shows a block diagram 1100 of a communications manager 1105 that supports multi-bit payload transmission with orthogonal sequences in accordance with aspects of the present disclosure. The communications manager 1105 may be an example of aspects of a communications manager 915, a communications manager 1015, or a communications manager 1210 described herein. The communications manager 1105 may include a sequence component 1110, a payload reception component 1115, and an index indication component 1120. Each of these modules may communicate, directly or indirectly, with one another (e.g., via one or more buses).

The sequence component 1110 may identify a set of sequences configured for conveying a payload including a set of bits, where each sequence of the set of sequences is orthogonal to each other sequence of the set of sequences. In some cases, the set of sequences includes four sequences.

The payload reception component 1115 may receive the payload including the set of bits using a first sequence from the set of sequences, the first sequence based on a mapping between the set of sequences and payload values corresponding to the set of bits. In some cases, the payload including the set of bits includes an uplink control information message including two bits.

The index indication component 1120 may transmit an indication of a starting index associated with an orthogonal matrix including the set of sequences. In some examples, the index indication component 1120 may transmit an indication of an index interval associated with an orthogonal matrix including the set of sequences. In some cases, the index interval includes a function of the number of the set of sequences and a number of columns in the orthogonal matrix. In some cases, the function includes a division of the number of columns in the matrix by the number of the set of sequences. In some cases, the function further includes a modulo function, a floor function, a ceiling function, or a combination thereof. In some cases, the orthogonal matrix includes a discrete Fourier transform (DFT) matrix or a Hadamard matrix.

Figure 12:
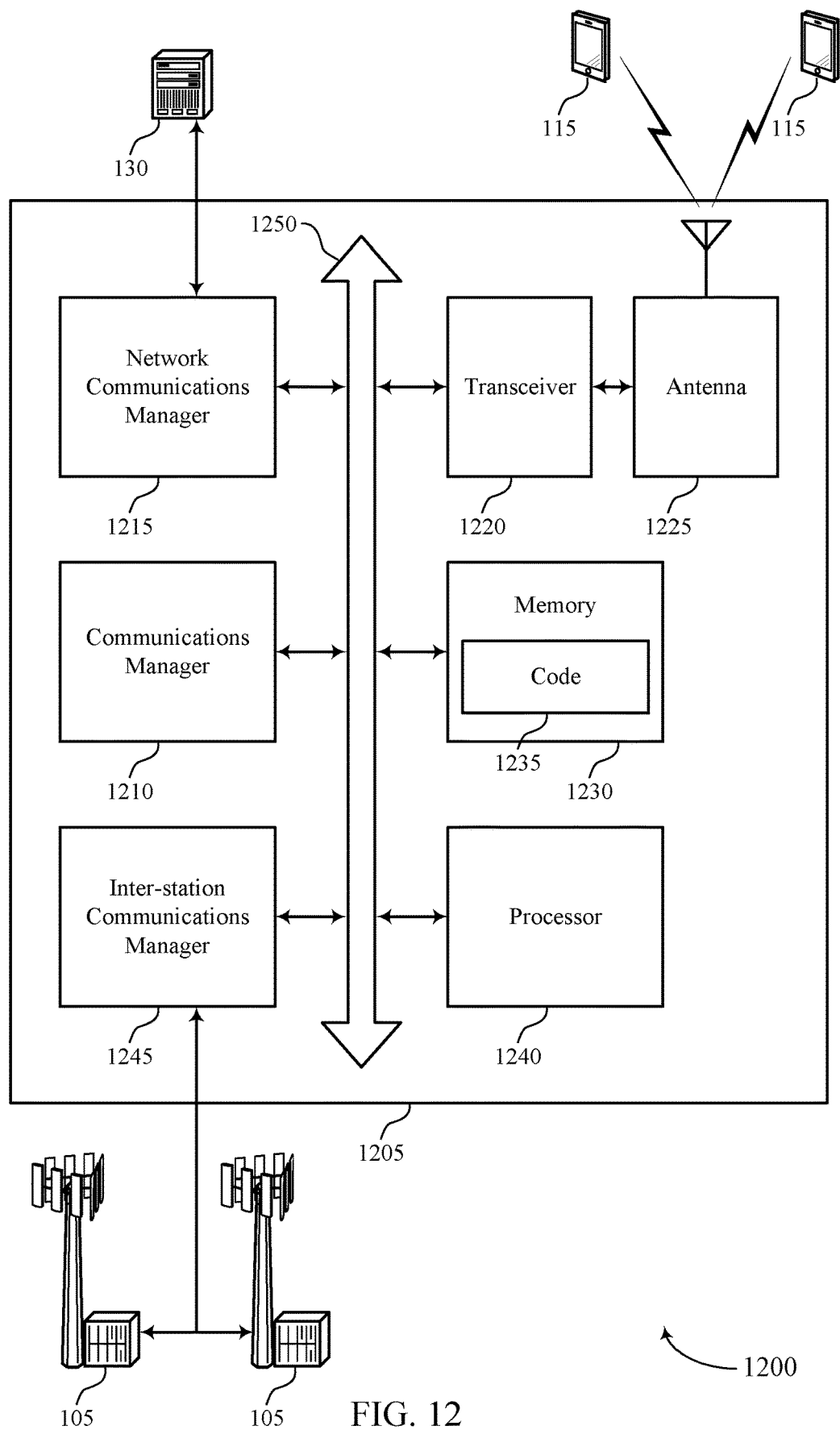
FIG. 12 shows a diagram of a system including a device that supports multi-bit payload transmission with orthogonal sequences in accordance with aspects of the present disclosure.

FIG. 12 shows a diagram of a system 1200 including a device 1205 that supports multi-bit payload transmission with orthogonal sequences in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a set of sequences configured for conveying a payload including a set of bits, where each sequence of the set of sequences is orthogonal to each other sequence of the set of sequences and receive the payload including the set of bits using a first sequence from the set of sequences, the first sequence based on a mapping between the set of sequences and payload values corresponding to the set of bits.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting multi-bit payload transmission with orthogonal sequences).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
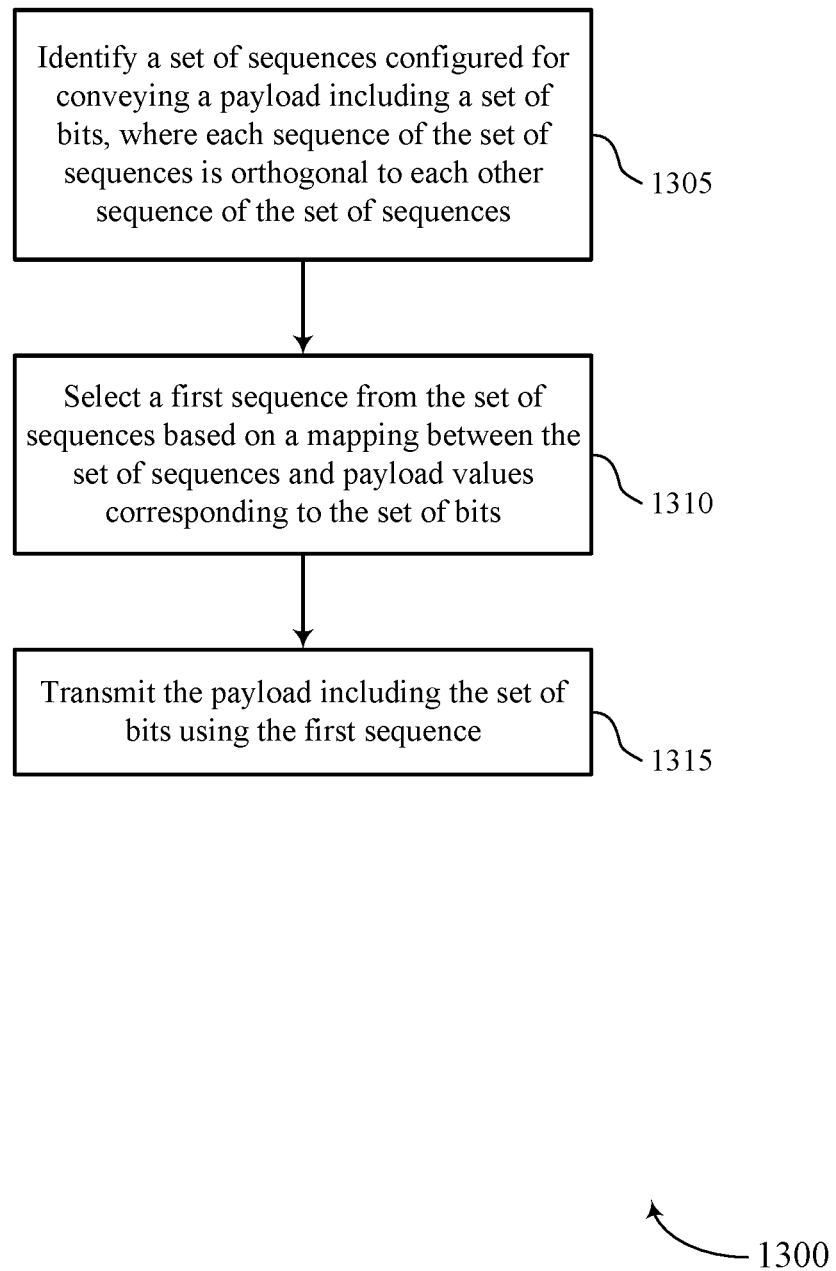
FIGS. 13 through 16 show flowcharts illustrating methods that support multi-bit payload transmission with orthogonal sequences in accordance with aspects of the present disclosure.

FIG. 13 shows a flowchart illustrating a method 1300 that supports multi-bit payload transmission with orthogonal sequences in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may identify a set of sequences configured for conveying a payload including a set of bits, where each sequence of the set of sequences is orthogonal to each other sequence of the set of sequences. The operations of 1305 may be performed according to the methods described herein. In some examples, aspects of the operations of 1305 may be performed by a sequence identification component as described with reference to FIGS. 5 through 8.

At 1310, the UE may select a first sequence from the set of sequences based on a mapping between the set of sequences and payload values corresponding to the set of bits. The operations of 1310 may be performed according to the methods described herein. In some examples, aspects of the operations of 1310 may be performed by a sequence selection component as described with reference to FIGS. 5 through 8.

At 1315, the UE may transmit the payload including the set of bits using the first sequence. The operations of 1315 may be performed according to the methods described herein. In some examples, aspects of the operations of 1315 may be performed by a payload transmission component as described with reference to FIGS. 5 through 8.

Figure 14:
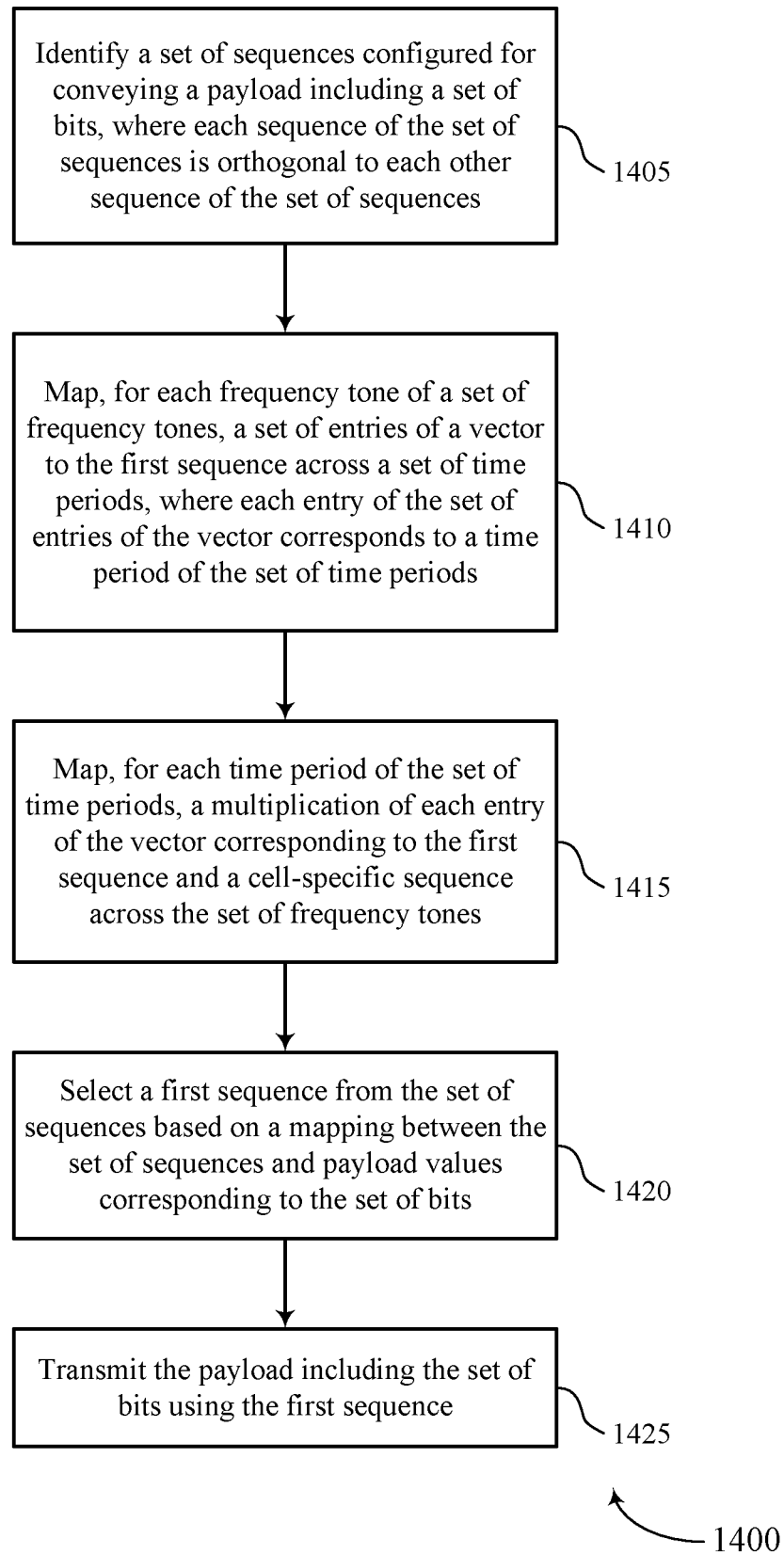

FIG. 14 shows a flowchart illustrating a method 1400 that supports multi-bit payload transmission with orthogonal sequences in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may identify a set of sequences configured for conveying a payload including a set of bits, where each sequence of the set of sequences is orthogonal to each other sequence of the set of sequences. The operations of 1405 may be performed according to the methods described herein. In some examples, aspects of the operations of 1405 may be performed by a sequence identification component as described with reference to FIGS. 5 through 8.

At 1410, the UE may map, for each frequency tone of a set of frequency tones, each entry of a set of entries of a vector corresponding to the first sequence to each time period of a set of time periods. The operations of 1410 may be performed according to the methods described herein. In some examples, aspects of the operations of 1410 may be performed by a vector mapping component as described with reference to FIGS. 5 through 8.

At 1415, the UE may map, for each time period of the set of time periods, a multiplication of each entry of the vector corresponding to the first sequence and a cell-specific sequence across the set of frequency tones. The operations of 1415 may be performed according to the methods described herein. In some examples, aspects of the operations of 1415 may be performed by a vector mapping component as described with reference to FIGS. 5 through 8.

At 1420, the UE may select a first sequence from the set of sequences based on a mapping between the set of sequences and payload values corresponding to the set of bits. The operations of 1420 may be performed according to the methods described herein. In some examples, aspects of the operations of 1420 may be performed by a sequence selection component as described with reference to FIGS. 5 through 8.

At 1425, the UE may transmit the payload including the set of bits using the first sequence. The operations of 1425 may be performed according to the methods described herein. In some examples, aspects of the operations of 1425 may be performed by a payload transmission component as described with reference to FIGS. 5 through 8.

Figure 15:
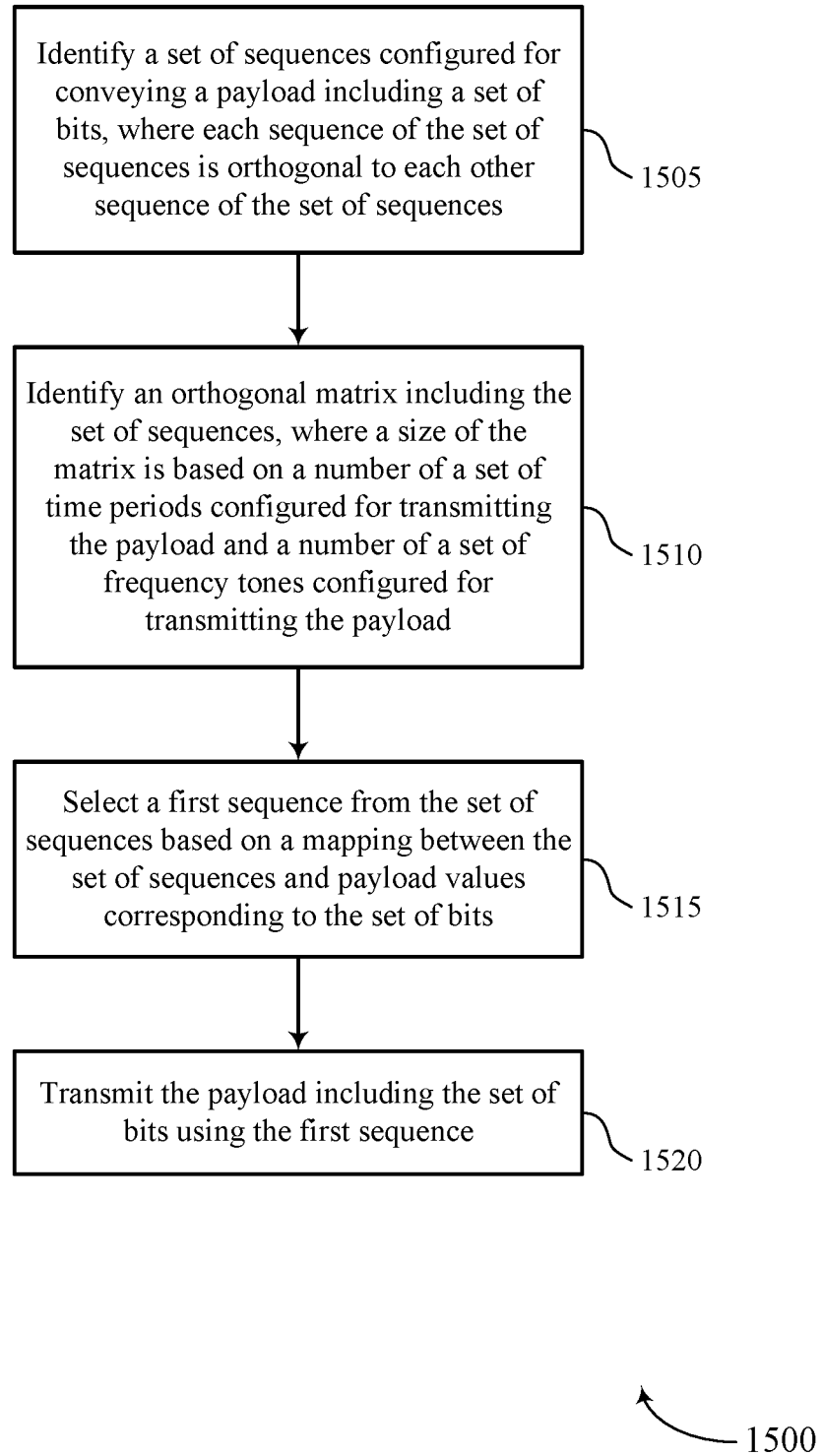

FIG. 15 shows a flowchart illustrating a method 1500 that supports multi-bit payload transmission with orthogonal sequences in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may identify a set of sequences configured for conveying a payload including a set of bits, where each sequence of the set of sequences is orthogonal to each other sequence of the set of sequences. The operations of 1505 may be performed according to the methods described herein. In some examples, aspects of the operations of 1505 may be performed by a sequence identification component as described with reference to FIGS. 5 through 8.

At 1510, the UE may identify an orthogonal matrix including the set of sequences, where a size of the orthogonal matrix is based on a number of a set of time periods configured for transmitting the payload and a number of a set of frequency tones configured for transmitting the payload. The operations of 1510 may be performed according to the methods described herein. In some examples, aspects of the operations of 1510 may be performed by a matrix component as described with reference to FIGS. 5 through 8.

At 1515, the UE may select a first sequence from the set of sequences based on a mapping between the set of sequences and payload values corresponding to the set of bits. The operations of 1515 may be performed according to the methods described herein. In some examples, aspects of the operations of 1515 may be performed by a sequence selection component as described with reference to FIGS. 5 through 8.

At 1520, the UE may transmit the payload including the set of bits using the first sequence. The operations of 1520 may be performed according to the methods described herein. In some examples, aspects of the operations of 1520 may be performed by a payload transmission component as described with reference to FIGS. 5 through 8.

Figure 16:
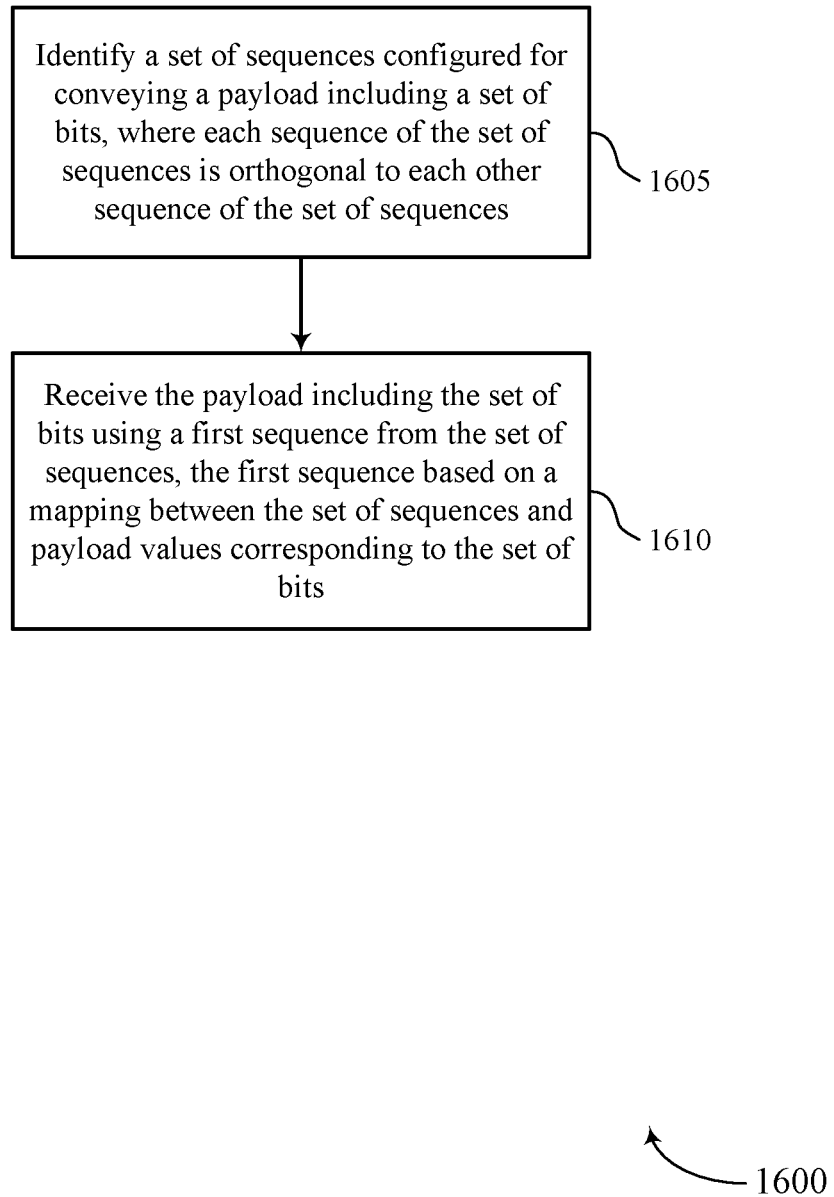

FIG. 16 shows a flowchart illustrating a method 1600 that supports multi-bit payload transmission with orthogonal sequences in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may identify a set of sequences configured for conveying a payload including a set of bits, where each sequence of the set of sequences is orthogonal to each other sequence of the set of sequences. The operations of 1605 may be performed according to the methods described herein. In some examples, aspects of the operations of 1605 may be performed by a sequence component as described with reference to FIGS. 9 through 12.

At 1610, the base station may receive the payload including the set of bits using a first sequence from the set of sequences, the first sequence based on a mapping between the set of sequences and payload values corresponding to the set of bits. The operations of 1610 may be performed according to the methods described herein. In some examples, aspects of the operations of 1610 may be performed by a payload reception component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: identifying a plurality of sequences configured for conveying a payload comprising a plurality of bits, wherein each sequence of the plurality of sequences is orthogonal to each other sequence of the plurality of sequences; selecting a first sequence from the plurality of sequences based at least in part on a mapping between the plurality of sequences and payload values corresponding to the plurality of bits; and transmitting the payload comprising the plurality of bits using the first sequence.

Aspect 2: The method of aspect 1, further comprising: identifying a starting index associated with an orthogonal matrix comprising the plurality of sequences; and identifying an index interval associated with the orthogonal matrix comprising the plurality of sequences.

Aspect 3: The method of aspect 2, further comprising: determining the plurality of sequences from the orthogonal matrix based at least in part on the starting index and the index interval.

Aspect 4: The method of any of aspects 2 through 3, wherein the index interval comprises a function of a number of the plurality of sequences and a number of columns in the orthogonal matrix.

Aspect 5: The method of aspect 4, wherein the function comprises a division of the number of columns in the orthogonal matrix by the number of the plurality of sequences.

Aspect 6: The method of aspect 5, wherein the function further comprises a modulo function, a floor function, a ceiling function, or a combination thereof.

Aspect 7: The method of any of aspects 2 through 6, further comprising: receiving an indication of the starting index, an indication of the index interval, or both.

Aspect 8: The method of any of aspects 2 through 7, wherein a number of the plurality of sequences is equal to two raised to a number of bits of the plurality of bits.

Aspect 9: The method of any of aspects 2 through 8, wherein the orthogonal matrix comprises a discrete Fourier transform (DFT) matrix or a Hadamard matrix.

Aspect 10: The method of any of aspects 1 through 9, further comprising: determining the plurality of sequences from an orthogonal matrix comprising the plurality of sequences based at least in part on a random selection.

Aspect 11: The method of any of aspects 1 through 10, further comprising: mapping, for each frequency tone of a plurality of frequency tones, each entry of a set of entries of a vector corresponding to the first sequence to each time period of a plurality of time periods; and mapping, for each time period of the plurality of time periods, a multiplication of each entry of the vector corresponding to the first sequence and a cell-specific sequence across the plurality of frequency tones.

Aspect 12: The method of any of aspects 1 through 11, further comprising: identifying an orthogonal matrix comprising the plurality of sequences, wherein a size of the orthogonal matrix is based at least in part on a number of a plurality of time periods configured for transmitting the payload and a number of a plurality of frequency tones configured for transmitting the payload.

Aspect 13: The method of aspect 12, further comprising: mapping a vector corresponding to the first sequence across the plurality of time periods and across the plurality of frequency tones according to a time first and frequency second mapping.

Aspect 14: The method of any of aspects 12 through 13, further comprising: mapping a vector corresponding to the first sequence across the plurality of time periods and across the plurality of frequency tones according to a frequency first and time second mapping.

Aspect 15: The method of any of aspects 1 through 14, further comprising: identifying an orthogonal matrix comprising the plurality of sequences, wherein a size of the orthogonal matrix is based at least in part on a number of a plurality of time periods configured for transmitting the payload.

Aspect 16: The method of any of aspects 1 through 15, wherein the payload comprising the plurality of bits comprises an uplink control information message comprising two bits.

Aspect 17: The method of aspect 16, wherein the plurality of sequences comprises four sequences.

Aspect 18: A method for wireless communications at a base station, comprising: identifying a plurality of sequences configured for conveying a payload comprising a plurality of bits, wherein each sequence of the plurality of sequences is orthogonal to each other sequence of the plurality of sequences; and receiving the payload comprising the plurality of bits using a first sequence from the plurality of sequences, the first sequence based at least in part on a mapping between the plurality of sequences and payload values corresponding to the plurality of bits.

Aspect 19: The method of aspect 18, further comprising: transmitting an indication of a starting index associated with an orthogonal matrix comprising the plurality of sequences.

Aspect 20: The method of any of aspects 18 through 19, further comprising: transmitting an indication of an index interval associated with an orthogonal matrix comprising the plurality of sequences.

Aspect 21: The method of aspect 20, wherein the index interval comprises a function of a number of the plurality of sequences and a number of columns in the orthogonal matrix.

Aspect 22: The method of aspect 21, wherein the function comprises a division of the number of columns in the orthogonal matrix by the number of the plurality of sequences.

Aspect 23: The method of aspect 22, wherein the function further comprises a modulo function, a floor function, a ceiling function, or a combination thereof.

Aspect 24: The method of any of aspects 20 through 23, wherein the orthogonal matrix comprises a discrete Fourier transform (DFT) matrix or a Hadamard matrix.

Aspect 25: The method of any of aspects 18 through 24, wherein the payload comprising the plurality of bits comprises an uplink control information message comprising two bits.

Aspect 26: The method of aspect 25, wherein the plurality of sequences comprises four sequences.

Aspect 27: An apparatus for wireless communications at a UE, comprising a processor; memory coupled with the processor; and instructions stored in the memory and executable by the processor to cause the apparatus to perform a method of any of aspects 1 through 17.

Aspect 28: An apparatus for wireless communications at a UE, comprising at least one means for performing a method of any of aspects 1 through 17.

Aspect 29: A non-transitory computer-readable medium storing code for wireless communications at a UE, the code comprising instructions executable by a processor to perform a method of any of aspects 1 through 17.

Aspect 30: An apparatus for wireless communications at a base station, comprising a processor; memory coupled with the processor; and instructions stored in the memory and executable by the processor to cause the apparatus to perform a method of any of aspects 18 through 26.

Aspect 31: An apparatus for wireless communications at a base station, comprising at least one means for performing a method of any of aspects 18 through 26.

Aspect 32: A non-transitory computer-readable medium storing code for wireless communications at a base station, the code comprising instructions executable by a processor to perform a method of any of aspects 18 through 26.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
 identifying a plurality of sequences configured for conveying a payload comprising a plurality of bits, wherein each sequence of the plurality of sequences comprises a plurality of symbols and each sequence of the plurality of sequences is orthogonal to each other sequence of the plurality of sequences;
 identifying an orthogonal matrix comprising the plurality of sequences, wherein a size of the orthogonal matrix is based at least in part on a quantity of a plurality of time periods configured for transmitting the payload;
 selecting a first sequence from the plurality of sequences based at least in part on a mapping between the plurality of sequences and payload values corresponding to the plurality of bits; and
 transmitting the payload comprising the plurality of bits using the first sequence.

2. The method of claim 1, further comprising:
 identifying a starting index associated with the orthogonal matrix comprising the plurality of sequences; and
 identifying an index interval associated with the orthogonal matrix comprising the plurality of sequences.

3. The method of claim 2, further comprising:
 determining the plurality of sequences from the orthogonal matrix based at least in part on the starting index and the index interval.

4. The method of claim 2, wherein the index interval comprises a function of a quantity of the plurality of sequences and a quantity of columns in the orthogonal matrix.

5. The method of claim 4, wherein the function comprises a division of the quantity of columns in the orthogonal matrix by the quantity of the plurality of sequences.

6. The method of claim 5, wherein the function further comprises a modulo function, a floor function, a ceiling function, or a combination thereof.

7. The method of claim 2, further comprising:
 receiving an indication of the starting index, an indication of the index interval, or both.

8. The method of claim 2, wherein a quantity of the plurality of sequences is equal to two raised to a quantity of bits of the plurality of bits.

9. The method of claim 2, wherein the orthogonal matrix comprises a discrete Fourier transform (DFT) matrix or a Hadamard matrix.

10. The method of claim 1, further comprising:
 determining the plurality of sequences from the orthogonal matrix comprising the plurality of sequences based at least in part on a random selection.

11. The method of claim 1, further comprising:
 mapping, for each frequency tone of a plurality of frequency tones, each entry of a set of entries of a vector corresponding to the first sequence to each time period of a plurality of time periods; and
 mapping, for each time period of the plurality of time periods, a multiplication of each entry of the vector corresponding to the first sequence and a cell-specific sequence across the plurality of frequency tones.

12. The method of claim 1,
 wherein the size of the orthogonal matrix is further based at least in part on a quantity of a plurality of frequency tones configured for transmitting the payload.

13. The method of claim 12, further comprising:
 mapping a vector corresponding to the first sequence across the plurality of time periods and across the plurality of frequency tones according to a time first and frequency second mapping.

14. The method of claim 12, further comprising:
 mapping a vector corresponding to the first sequence across the plurality of time periods and across the plurality of frequency tones according to a frequency first and time second mapping.

15. The method of claim 1, wherein the payload comprising the plurality of bits comprises an uplink control information message comprising two bits.

16. The method of claim 15, wherein the plurality of sequences comprises four sequences.

17. A method for wireless communications at a network device, comprising:
 identifying a plurality of sequences configured for conveying a payload comprising a plurality of bits, wherein each sequence of the plurality of sequences comprises a plurality of symbols and each sequence of the plurality of sequences is orthogonal to each other sequence of the plurality of sequences;
 identifying an orthogonal matrix comprising the plurality of sequences, wherein a size of the orthogonal matrix is based at least in part on a quantity of a plurality of time periods configured for transmitting the payload; and
 receiving the payload comprising the plurality of bits using a first sequence from the plurality of sequences, the first sequence based at least in part on a mapping between the plurality of sequences and payload values corresponding to the plurality of bits.

18. The method of claim 17, further comprising:
 transmitting an indication of a starting index associated with the orthogonal matrix comprising the plurality of sequences.

19. The method of claim 17, further comprising:
 transmitting an indication of an index interval associated with orthogonal matrix comprising the plurality of sequences.

20. The method of claim 19, wherein the index interval comprises a function of a quantity of the plurality of sequences and a quantity of columns in the orthogonal matrix.

21. The method of claim 20, wherein the function comprises a division of the quantity of columns in the orthogonal matrix by the quantity of the plurality of sequences.

22. The method of claim 21, wherein the function further comprises a modulo function, a floor function, a ceiling function, or a combination thereof.

23. The method of claim 19, wherein the orthogonal matrix comprises a discrete Fourier transform (DFT) matrix or a Hadamard matrix.

24. The method of claim 17, wherein the payload comprising the plurality of bits comprises an uplink control information message comprising two bits.

25. The method of claim 24, wherein the plurality of sequences comprises four sequences.

26. An apparatus for wireless communications at a user equipment (UE), comprising:
 a processor,
 memory coupled with the processor; and
 instructions stored in the memory and executable by the processor to cause the apparatus to:
  identify a plurality of sequences configured for conveying a payload comprising a plurality of bits, wherein each sequence of the plurality of sequences comprises a plurality of symbols and each sequence of the plurality of sequences is orthogonal to each other sequence of the plurality of sequences;
  identify an orthogonal matrix comprising the plurality of sequences, wherein a size of the orthogonal matrix is based at least in part on a quantity of a plurality of time periods configured for transmitting the payload;
  select a first sequence from the plurality of sequences based at least in part on a mapping between the plurality of sequences and payload values corresponding to the plurality of bits; and
  transmit the payload comprising the plurality of bits using the first sequence.

27. The apparatus of claim 26, wherein the instructions are further executable by the processor to cause the apparatus to:
 identify a starting index associated with the orthogonal matrix comprising the plurality of sequences; and
 identify an index interval associated with the orthogonal matrix comprising the plurality of sequences.

28. The apparatus of claim 27, wherein the instructions are further executable by the processor to cause the apparatus to:
 determine the plurality of sequences from the orthogonal matrix based at least in part on the starting index and the index interval.

29. An apparatus for wireless communications at a network device, comprising:
 a processor,
 memory coupled with the processor; and instructions stored in the memory and executable by the processor to cause the apparatus to:
 identify a plurality of sequences configured for conveying a payload comprising a plurality of bits, wherein each sequence of the plurality of sequences comprises a plurality of symbols and each sequence of the plurality of sequences is orthogonal to each other sequence of the plurality of sequences;
 identify an orthogonal matrix comprising the plurality of sequences, wherein a size of the orthogonal matrix is based at least in part on a quantity of a plurality of time periods configured for transmitting the payload; and
 receive the payload comprising the plurality of bits using a first sequence from the plurality of sequences, the first sequence based at least in part on a mapping between the plurality of sequences and payload values corresponding to the plurality of bits.

* * * * *